United States Patent
Sone et al.

(10) Patent No.: US 12,142,822 B2
(45) Date of Patent: Nov. 12, 2024

(54) WIRING MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Kosuke Sone, Mie (JP); Hiroki Hirai, Mie (JP); Yasuyuki Yamamoto, Mie (JP); Kazuyoshi Ohara, Mie (JP); Norichika Oomi, Mie (JP); Daisuke Miyawaki, Mie (JP); Shinichi Ishiko, Mie (JP); Yuji Takenaka, Mie (JP); Ichiro Kuwayama, Osaka (JP); Suguru Yamagishi, Osaka (JP); Toyohisa Takano, Osaka (JP); Yutaro Miki, Osaka (JP); Takanori Fukunaga, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 163 days.

(21) Appl. No.: 17/440,485

(22) PCT Filed: Mar. 27, 2020

(86) PCT No.: PCT/JP2020/013993
§ 371 (c)(1),
(2) Date: Sep. 17, 2021

(87) PCT Pub. No.: WO2020/203757
PCT Pub. Date: Oct. 8, 2020

(65) Prior Publication Data
US 2022/0158335 A1    May 19, 2022

(30) Foreign Application Priority Data

Mar. 29, 2019 (JP) ................................. 2019-066550
Mar. 29, 2019 (JP) ................................. 2019-066841

(51) Int. Cl.
*H01Q 1/32* (2006.01)
*B60R 11/02* (2006.01)
(Continued)

(52) U.S. Cl.
CPC ........... *H01Q 1/32* (2013.01); *B60R 11/0205* (2013.01); *B60R 13/0815* (2013.01);
(Continued)

(58) Field of Classification Search
CPC .......... H01Q 1/32; H01Q 1/3275; H01Q 1/12; H01Q 1/22; H01Q 1/40; H01Q 15/14;
(Continued)

(56) References Cited

U.S. PATENT DOCUMENTS

2002/0000932 A1   1/2002  Metzen
2006/0273967 A1   12/2006 Gat et al.
(Continued)

FOREIGN PATENT DOCUMENTS

CN    104364969    2/2015
CN    104467425    3/2015
(Continued)

OTHER PUBLICATIONS

International Search Report issued in International Pat. Appl. No. PCT/JP2020/013993, dated Jun. 23, 2020, along with an English translation thereof.
(Continued)

*Primary Examiner* — Hoang V Nguyen
(74) *Attorney, Agent, or Firm* — Greenblum & Bernstein, P.L.C.

(57) ABSTRACT

A wiring module includes: a functional sheet disposed between a roof panel forming a roof part of a vehicle and an
(Continued)

interior member forming a ceiling shape of a vehicle interior to planarly extend over the roof panel and the interior member; and a transmission member provided on the functional sheet, wherein the functional sheet includes a layer having at least one of a heat insulation function, an acoustic insulation function, and a radio wave shielding function, the transmission member is electrically connected to a vehicle-side apparatus mounted to a side of the vehicle, and the transmission member is formed to extend to a position where the transmission member can perform a power supply to or communication with a roof-side apparatus mounted to the roof part in the functional sheet.

7 Claims, 15 Drawing Sheets

(51) Int. Cl.
| | |
|---|---|
| *B60R 13/08* | (2006.01) |
| *B60R 16/02* | (2006.01) |
| *H01Q 1/12* | (2006.01) |
| *H01Q 1/22* | (2006.01) |
| *H01Q 15/14* | (2006.01) |
| *H04B 1/3822* | (2015.01) |

(52) U.S. Cl.
CPC .......... *B60R 16/0207* (2013.01); *H01Q 1/12* (2013.01); *H01Q 1/22* (2013.01); *H01Q 1/3275* (2013.01); *H01Q 15/14* (2013.01); *H04B 1/3822* (2013.01)

(58) Field of Classification Search
CPC .... H01Q 15/0013; H01Q 21/28; H01Q 23/00; B06R 11/0205
See application file for complete search history.

(56) References Cited

U.S. PATENT DOCUMENTS

| | | |
|---|---|---|
| 2007/0171137 A1 | 7/2007 | Mierzwa et al. |
| 2009/0002240 A1 | 1/2009 | Sievenpiper et al. |
| 2010/0201584 A1 | 8/2010 | Schaffner et al. |
| 2015/0079914 A1 | 3/2015 | Takahashi et al. |
| 2015/0171510 A1 | 6/2015 | Hirose |
| 2017/0317399 A1 | 11/2017 | Droste |
| 2017/0317408 A1 | 11/2017 | Hamada et al. |
| 2017/0346156 A1 | 11/2017 | Morris et al. |
| 2018/0026326 A1 | 1/2018 | Noh et al. |
| 2018/0205264 A1 | 7/2018 | Akuzawa |
| 2018/0261912 A1 | 9/2018 | Mizuno et al. |
| 2018/0294555 A1 | 10/2018 | Nagashima |
| 2018/0309196 A1 | 10/2018 | Mayer et al. |
| 2018/0316365 A1 | 11/2018 | Volkel et al. |
| 2019/0141833 A1 | 5/2019 | Hosoda |
| 2020/0062198 A1 | 2/2020 | Mizushita et al. |
| 2021/0210857 A1 | 7/2021 | Sayama et al. |
| 2021/0280538 A1 | 9/2021 | Kaeding |
| 2022/0006178 A1 | 1/2022 | Shimura |
| 2022/0077590 A1 | 3/2022 | Itami et al. |

FOREIGN PATENT DOCUMENTS

| | | | | |
|---|---|---|---|---|
| CN | 107453026 | 12/2017 | | |
| CN | 108028459 | 5/2018 | | |
| JP | 2005-047354 | 2/2005 | | |
| JP | 2005-051338 | 2/2005 | | |
| JP | 200547354 A | * 2/2005 | ............. | B60R 13/02 |
| JP | 2008079145 A | * 4/2008 | ............. | H01Q 1/22 |
| JP | 2008-252046 | 10/2008 | | |
| JP | 2009-171019 | 7/2009 | | |
| JP | 2013-038581 | 2/2013 | | |
| JP | 2014-33344 | 2/2014 | | |
| JP | 2016-048979 | 4/2016 | | |
| JP | 2016-120759 | 7/2016 | | |
| JP | 2017-200086 | 11/2017 | | |
| JP | 2018-67881 | 4/2018 | | |
| JP | 2018-090229 | 6/2018 | | |
| JP | 201890229 A | * 6/2018 | ............. | B60R 16/02 |
| JP | 2018-191281 | 11/2018 | | |
| JP | 2018-196174 | 12/2018 | | |
| JP | 2018-207625 | 12/2018 | | |
| WO | 2014/166869 | 10/2014 | | |
| WO | 2018/074007 | 4/2018 | | |

OTHER PUBLICATIONS

International Search Report issued in International Pat. Appl. No. PCT/JP2020/013957, dated Jun. 16, 2020, along with an English translation thereof.
International Search Report issued in International Pat. Appl. No. PCT/JP2020/013995, dated Jun. 16, 2020, along with an English translation thereof.
U.S. Appl. No. 17/441,027, filed Sep. 20, 2021.
U.S. Appl. No. 17/441,065, filed Sep. 20, 2021.
U.S. Appl. No. 17/441,505, filed Sep. 21, 2021.
International Preliminary Report on Patentability of Corresponding PCT Application No. PCT/JP2020/013993, dated Sep. 30, 2021, along with an English translation thereof.
International Preliminary Report on Patentability of Corresponding PCT Application No. PCT/JP2020/013957, dated Sep. 30, 2021, along with an English translation thereof.
International Preliminary Report on Patentability of Corresponding PCT Application No. PCT/JP2020/013995, dated Sep. 28, 2021, along with an English translation thereof.
Office Action issued in Corresponding Japanese Patent Application No. 2021-511990, dated Jul. 26, 2022, along with an English translation thereof.
Office Action issued in Corresponding Japanese Patent Application No. 2021-511991, dated Aug. 2, 2022, along with an English translation thereof.
Office Action issued in Corresponding Japanese Patent Application No. 2021-511981, dated Jul. 26, 2022, along with an English translation thereof.
Office Action issued in CN Patent Application No. 202080026052.X, dated Nov. 11, 2023, along with an English translation thereof.
Office Action issued in CN Patent Application No. 202080025585.6, dated Nov. 20, 2023, along with an English translation thereof.
Office Action issued in Corresponding CN Patent Application No. 202080023507.2, dated Dec. 28, 2023, along with an English translation thereof.
Office Action issued in CN Patent Application No. 202080025585.6, dated Jun. 1, 2024, along with an English translation thereof.
Office Action issued in Chinese Patent Application No. 202080026052.X, dated Apr. 30, 2024, along with an English translation thereof.
Office Action issued in CN Patent Application No. 202080026052.X, dated Aug. 21, 2024, along with an English translation thereof.

* cited by examiner

F I G. 6
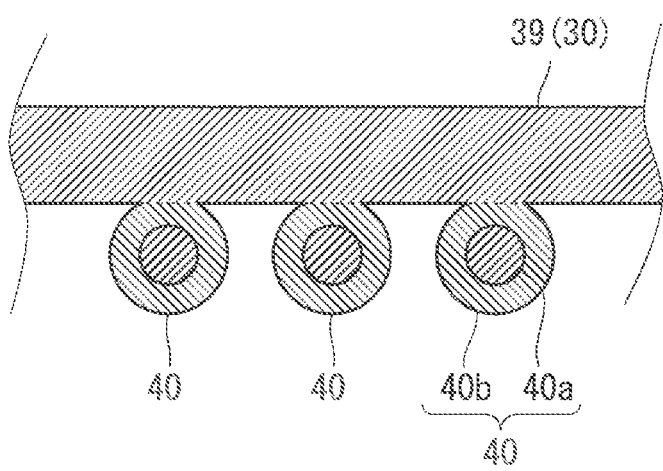

F I G. 14
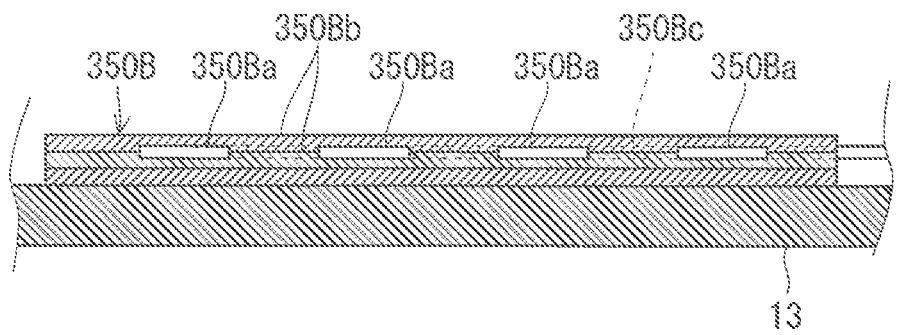

WIRING MODULE

TECHNICAL FIELD

The present disclosure relates to a wiring module.

BACKGROUND ART

Patent Document 1 discloses a wire harness assembly body assembled to a body of a vehicle. The wire harness assembly body includes a sheet-like acoustic insulation material, a sheet-like protection material stacked on the acoustic insulation material, and a wire harness having at least one electrical wire routed between the acoustic insulation material and the protection material.

Patent Document 2 discloses a laying structure of a wiring module including a panel member, a wiring module, and a panel peripheral component. The wiring module includes a sheet-like member and at least one electrical wire. The sheet-like member is laid on a main surface of the panel member. At least one electrical wire is fixed to the sheet-like member so that the sheet-like member is disposed along a predetermined wiring route in a state where the sheet-like member is laid on a main surface of the panel member. The panel peripheral component is provided in a constant position with respect to the panel member to position the wiring module on the panel member.

PRIOR ART DOCUMENTS

Patent Documents

Patent Document 1: Japanese Patent Application Laid-Open No. 2018-090229
Patent Document 2: Japanese Patent Application Laid-Open No. 2018-207625

SUMMARY

Problem to be Solved by the Invention

An apparatus and a transmission member connected to the apparatus are incorporated into a vehicle. Required is that a sheet such as a sheet-like acoustic insulation member, an apparatus, and a transmission member are easily incorporated into a body of an automobile.

Accordingly, an object is to be able to easily incorporate a functional sheet, an apparatus, and a transmission member to a vehicle.

Means to Solve the Problem

A wiring module according to the present disclosure is a wiring module including: a functional sheet disposed between a roof panel forming a roof part of a vehicle and an interior member forming a ceiling shape of a vehicle interior to planarly extend over the roof panel and the interior member; and a transmission member provided on the functional sheet, wherein the functional sheet includes a layer having at least one of a heat insulation function, an acoustic insulation function, and a radio wave shielding function, the transmission member is electrically connected to a vehicle-side apparatus mounted to a side of the vehicle, and the transmission member is formed to extend to a position where the transmission member can perform a power supply to or communication with a roof-side apparatus mounted to the roof part in the functional sheet.

Effects of the Invention

According to the present disclosure, the functional sheet, the apparatus, and the transmission member are easily incorporated into the vehicle.

BRIEF DESCRIPTION OF DRAWINGS

FIG. 6 is a cross-sectional view illustrating a state where a wire-like transmission member is welded to a base material.
FIG. 14 is a cross-sectional view along an XIV-XIV line in FIG. 13.

DESCRIPTION OF EMBODIMENT(S)

Description of Embodiment of Present Disclosure

Figure 1:
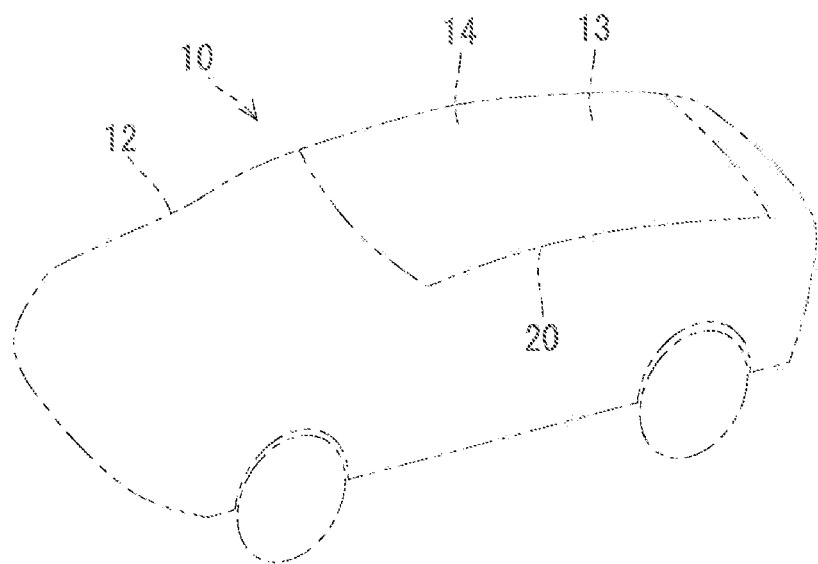
FIG. 1 is a schematic perspective view illustrating a vehicle into which a wiring module is incorporated.

Embodiments of the present disclosure are listed and described firstly.

A wiring module according to the present disclosure is as follows.

(1) A wiring module includes: a functional sheet disposed between a roof panel forming a roof part of a vehicle and an interior member forming a ceiling shape of a vehicle interior to planarly extend over the roof panel and the interior member; and a transmission member provided on the functional sheet, wherein the functional sheet includes a layer having at least one of a heat insulation function, an acoustic insulation function, and a radio wave shielding function, the transmission member is electrically connected to a vehicle-side apparatus mounted to a side of the vehicle, and the transmission member is formed to extend to a position where the transmission member can perform a power supply to or communication with a roof-side apparatus mounted to the roof part in the functional sheet. According to the present wiring module, the functional sheet and the transmission member provided on the functional sheet are easily incorporated into the roof part of the vehicle. The transmission member is formed to extend to a position where the transmission member can perform a power supply to or communication with a roof-side apparatus mounted to the roof part in the functional sheet. Thus, the transmission member and the roof-side apparatus can be collectively incorporated into the roof part easily, or the transmission member and the roof-side apparatus can be connected to each other in the roof part easily. Thus, the functional sheet, the transmission member, and the apparatus can be incorporated into the roof part of the vehicle easily.

Herein, a case where the transmission member and the vehicle-side apparatus are electrically connected includes a case where the transmission member is directly connected to the vehicle-side apparatus and a case where the transmission member is electrically connected to the vehicle-side apparatus via a wiring laid from the vehicle-side apparatus to the roof part.

(2) In the wiring module according to (1), the transmission member may include a first transmission member formed to extend from a position in the functional sheet where an electronic control unit controlling the roof-side apparatus is mounted to a position where the transmission member can perform a power supply to or communication with the roof-side apparatus. The electronic control unit and the roof-side apparatus are easily connected by the first transmission member.

(3) The wiring module according to (2) may further include a second transmission member extending from a position in the functional sheet where the electronic control unit is mounted to an outward direction of the functional sheet and electrically connected to the vehicle-side apparatus. The electronic control unit is easily connected to the vehicle-side apparatus via the second transmission member.

(4) In the wiring module according to (2) or (3), the electronic control unit may be provided on the functional sheet. The electronic control unit is easily incorporated into the roof part together with the functional sheet.

(5) In the wiring module according to a configuration of any one of (1) to (4), a holder holding and electrically connecting at least one of the electronic control unit and the roof-side apparatus to the transmission member may be provided on the functional sheet. At least one of the electronic control unit and the roof-side apparatus can be electrically connected to the transmission member easily by the holder provided on the functional sheet.

(6) In the wiring module according to a configuration of any one of (1) to (5), it is applicable that the roof-side apparatus includes an interior-side antenna performing wireless communication with an apparatus in a vehicle interior, and the interior-side antenna is provided closer to a side of the vehicle interior in relation to a radio wave shielding layer having a radio wave shielding function on the functional sheet including the radio wave shielding layer. Communication with the apparatus in the vehicle interior is favorably performed.

(7) In the wiring module according to a configuration of any one of (1) to (6), it is applicable that the roof-side apparatus includes an external communication antenna performing communication with an apparatus located on an outer side of the vehicle, and the external communication antenna is provided closer to the outer side of the vehicle in relation to a radio wave shielding layer having a radio wave shielding function on the functional sheet including the radio wave shielding layer. Communication with the apparatus located on the outer side of the vehicle is favorably performed.

(8) In the wiring module according to a configuration of any one of (1) to (6), it is applicable that the roof-side apparatus includes an external communication antenna provided on the roof panel to communicate with an apparatus located on the outer side of the vehicle, and the external communication antenna is electrically connected to the transmission member via a connector disposed in a position in the functional sheet where the external communication antenna is provided. Also in a case where the external communication antenna is separated from the functional sheet and incorporated into the roof panel, the transmission member is easily connected to the external communication antenna via the connector.

Details of Embodiment of Present Disclosure

Specific examples of a wiring module of the present disclosure are described hereinafter with reference to the drawings. The present disclosure is not limited to these examples, but is indicated by claims, and it is intended that meanings equivalent to claims and all modifications within a scope of claims are included.

Embodiment 1

A wiring module according to an embodiment 1 is described hereinafter.

<Vehicle into which Wiring Module is Incorporated>

FIG. 1 is a schematic perspective view illustrating a vehicle 10 into which a wiring module 20 is incorporated. The vehicle 10 includes a body 12. The body 12 is a part forming an outline of the vehicle 10. The body 12 may be a monocoque body or a body mounted on a ladder type frame. Herein, the body 12 includes a lateral panel surrounding a vehicle interior, a roof panel 13, a boarding door panel for a passenger to get in or out of a vehicle, and a rear door panel to take in and out a luggage, for example. The body 12 may be formed by metal or resin. The body 12 may also be made of a combination of metal and resin. A plate-like part of the body 12 covering an upper side of the vehicle interior constitutes the roof panel 13. That is to say, the roof panel 13 forms a roof part of the vehicle 10. The roof panel 13 may be partially or wholly curved to form an appearance shape of the body 12. The roof panel 13 may be formed by metal or resin. The roof panel 13 may also be made of a combination of metal and resin. Herein, an antenna hole 13h is formed in the roof panel 13 (refer to FIG. 2).

The wiring module 20 is incorporated into the vehicle 10. In the example described in the present embodiment, the wiring module 20 is incorporated into a roof 14 including the roof panel 13. The wiring module 20 may also be incorporated into the other member in the vehicle 10 such as a boarding door, a rear door, and an installment panel, for example.

Figure 2:
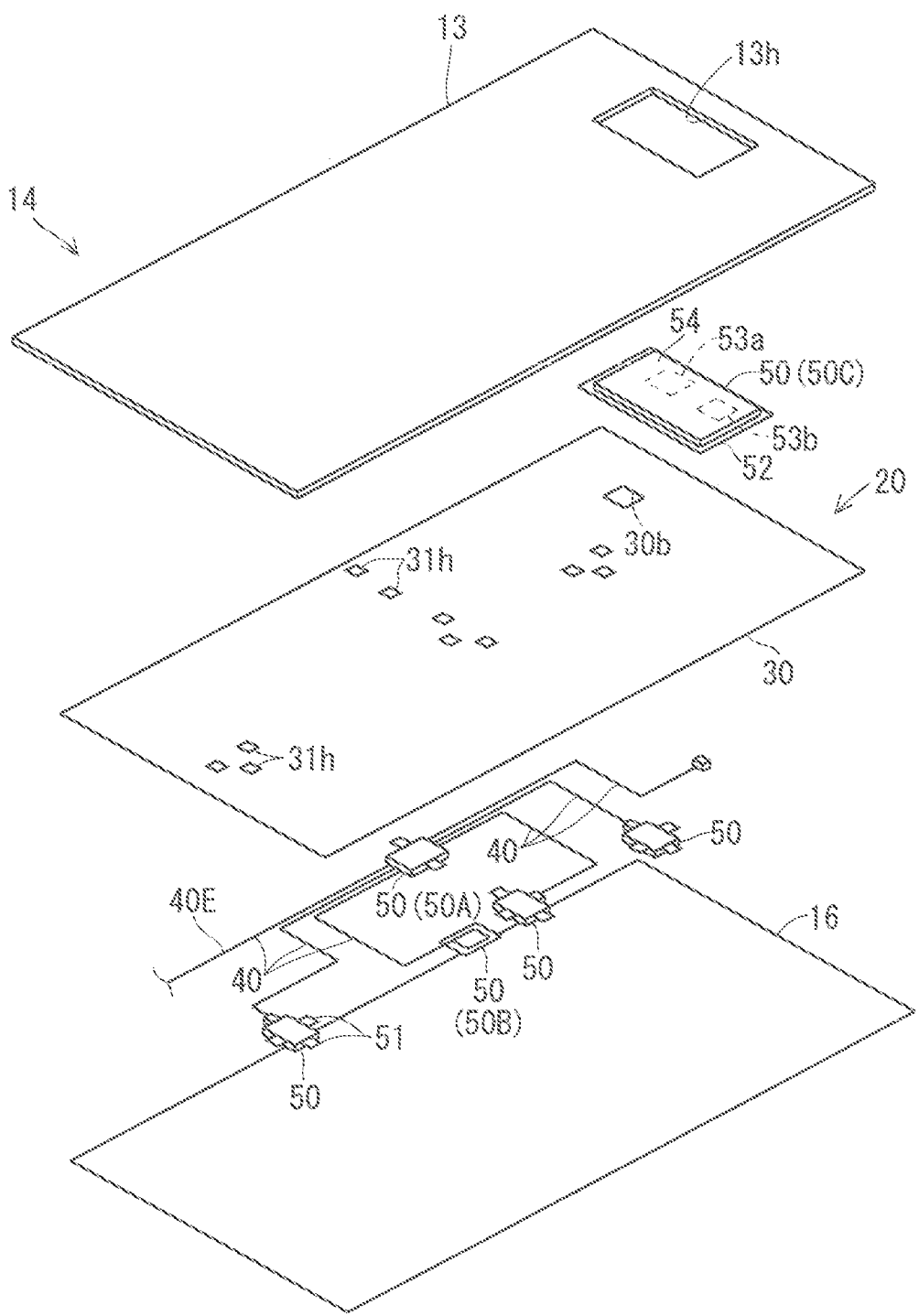
FIG. 2 is an exploded perspective view illustrating the wiring module.
Figure 3:
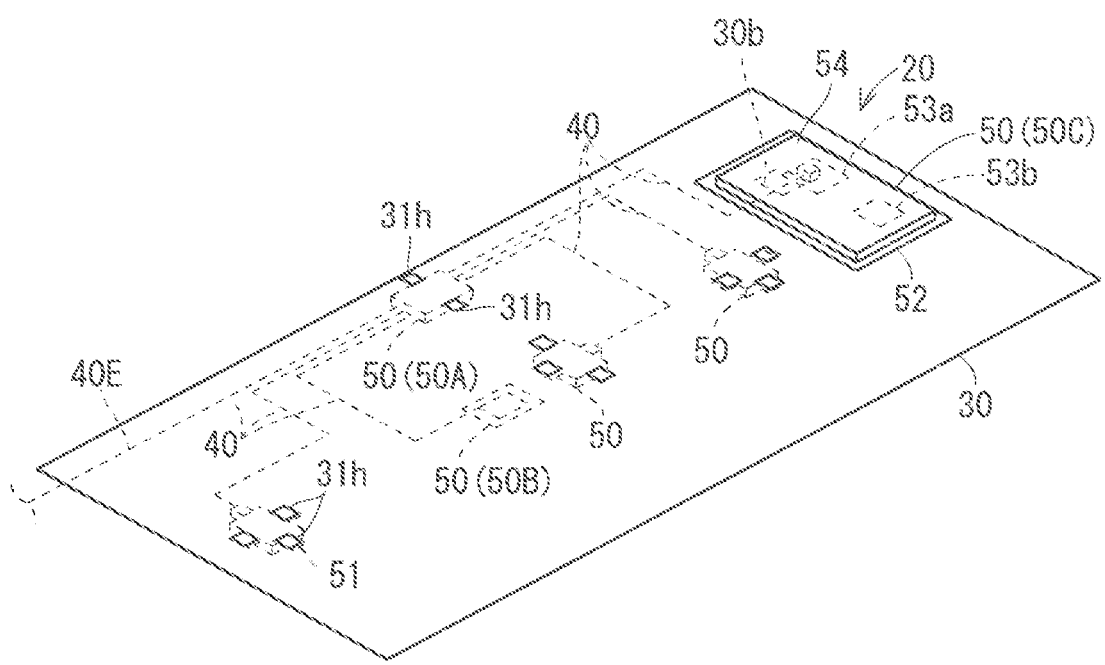
FIG. 3 is a perspective view illustrating the wiring module.

FIG. 2 is an exploded perspective view illustrating the wiring module 20. FIG. 3 is a perspective view illustrating the wiring module 20. FIG. 2 illustrates the roof 14. The roof panel 13 described above and an interior member 16 are illustrated as the roof 14. The interior member 16 is a plate-like member formed of resin, for example. The interior member 16 may be partially or wholly curved to form a ceiling shape of the vehicle interior. The interior member 16 is attached to a lower side of the roof panel 13. The interior member 16 is a part exposed to the vehicle interior. The interior member 16 is also referred to as a roof liner in some cases. In the present embodiment, the wiring module 20 is provided between the roof panel 13 and the interior member 16.

<Whole Structure of Wiring Module>

The wiring module 20 includes a functional sheet 30, a wire-like transmission member 40, and an apparatus 50.

The functional sheet 30 is a sheet-like member having functions other than a function of fixing the wire-like transmission member 40 and the apparatus 50. Examples of the functions of the functional sheet 30 include a heat insulation function, an acoustic insulation function, and a radio wave shielding function. A specific example of the functional sheet 30 having these functions is described hereinafter.

The functional sheet 30 is incorporated into the roof 14 to planarly extend over the roof 14. For example, the functional sheet 30 may be disposed to cover 80% or more of an area of the roof 14. For example, the functional sheet 30 may be disposed to extend over a whole upper side of head rests of a plurality of passenger seats in the vehicle. The functional sheet 30 is disposed to extend over the roof 14, thus the wire-like transmission member 40 and the apparatus 50 can be fixed to the roof 14 in a region as large as possible. The function of the functional sheet 30 can be performed on a region in the roof 14 as large as possible.

The wire-like transmission member 40 is a wire-like member transmitting electrical power or light, for example, and is an example of a transmission member. For example, the wire-like transmission member may be a general wire having a core wire and a covering around the core wire, or may also be a bare conductive wire, a shielded wire, an electrical cable, an enamel wire, a nichrome wire, a coaxial wire, or an optical fiber. The wire-like transmission member transmitting the electrical power may be various kinds of signal lines or various kinds of power lines. The wire-like transmission member may be a single wire-like object or a composite object of a plurality of wire-like objects (a twisted wire and a cable made up of a plurality of wire-like objects covered by a sheath). The transmission member may be formed by applying a conductive coating on the functional sheet and etching on a copper foil, for example.

The wire-like transmission member 40 is fixed to the functional sheet 30. It is sufficient that the wire-like transmission member 40 is disposed along a constant route on the functional sheet 30, thus a specific configuration for fixation is not particularly limited.

A state where the transmission member is formed on the functional sheet indicates that a medium transmitting the electrical power is formed to constitute an electrical route on the functional sheet. Thus, the transmission member formed on the functional sheet 30 includes a transmission member directly formed by applying a conductive coating to the functional sheet 30 and etching on a copper foil and a transmission member in which the wire-like transmission member 40 manufactured separately from the functional sheet 30 is attached to form a constant route along one of or both main surfaces of the functional sheet 30.

For example, the wire-like transmission member 40 may be fixed to one main surface of the functional sheet 30. For example, the wire-like transmission member 40 may be welded (or fused) to one main surface of the functional sheet 30. A welding part thereby formed has a configuration that a part of at least one of the wire-like transmission member 40 and the functional sheet 30 is melted and adheres to the other side member. The wire-like transmission member 40 and the functional sheet 30 may be welded by ultrasonic welding or thermal welding. It is also applicable that a surface of at least one of the wire-like transmission member 40 and the functional sheet 30 is melted by a solvent to weld the wire-like transmission member 40 and the functional sheet 30. For example, the wire-like transmission member 40 may be fixed to the functional sheet 30 by an adhesive agent or a double-sided tape. For example, the wire-like transmission member 40 may be sewn to the functional sheet 30 by a sewing thread. It is also applicable that an adhesive tape is attached to a portion from a side of one main surface of the functional sheet 30 across the wire-like transmission member 40 in a state where the wire-like transmission member 40 is disposed on one main surface of the functional sheet 30 to fix the wire-like transmission member 40 to one main surface of the functional sheet 30, for example. The wire-like transmission member 40 needs not be fixed to only one main surface of the functional sheet 30. The wire-like transmission member 40 may include both a part fixed to one main surface of the functional sheet 30 and a part fixed to the other main surface of the functional sheet 30. In this case, the wire-like transmission member 40 may be provided to pass from one main surface toward the other main surface in a middle portion or an end edge portion of the functional sheet 30.

For example, the wire-like transmission member 40 may be sandwiched between two sheets, thereby being fixed to the functional sheet 30. For example, in a case where the functional sheet 30 includes a plurality of layers, the wire-like transmission member 40 may be sandwiched between sheets constituting each layer. In a case where the other sheet overlaps with the functional sheet 30, the wire-like transmission member 40 may be sandwiched between the functional sheet 30 and the other sheet. In this case, the two sheets sandwiching the wire-like transmission member 40 may be fixed by welding, or may also be fixed by an adhesive agent or a double-sided tape.

With regard to a relationship with external communication antennas 53a and 53b, the wire-like transmission member 40 is preferably provided on a surface of the functional sheet 30 on a side opposite to a surface where the external communication antennas 53a and 53b are provided. The reason is that the external communication antennas 53a and 53b and the wire-like transmission member 40 are separated from each other by a distance in accordance with a thickness of the functional sheet 30, and an influence of noise therebetween is suppressed.

Figure 11:
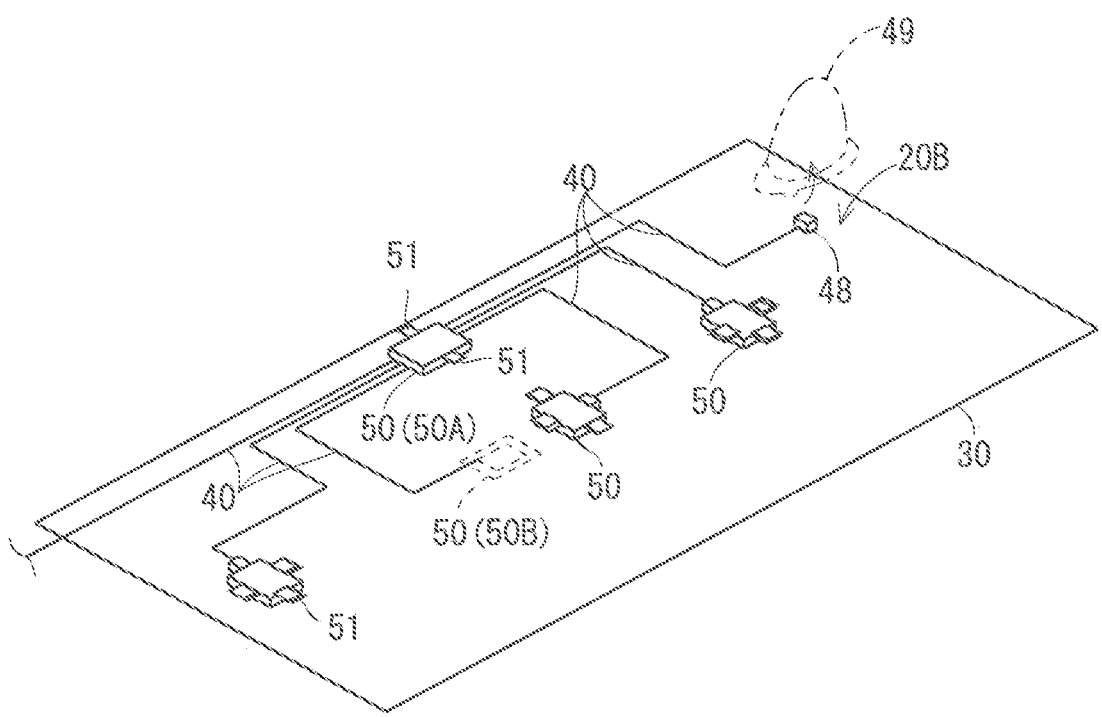
FIG. 11 is a schematic perspective view illustrating a wiring module according to a modification example.

With regard to a relationship with an interior-side antenna 50B, the wire-like transmission member 40 is preferably provided on a surface of the functional sheet 30 on a side opposite to a surface where the interior-side antenna 50B is provided (refer to an example illustrated in FIG. 11). The reason is that the interior-side antenna 50B and the wire-like transmission member 40 are separated from each other by a distance in accordance with a thickness of the functional sheet 30, and an influence of noise therebetween is suppressed.

The wire-like transmission member 40 is connected to the apparatus 50. The apparatus 50 transmits or receives an electrical signal or an optical signal via the wire-like transmission member 40. Alternatively, the apparatus 50 receives a power supply or distributes electrical power via the wire-like transmission member 40. The wire-like transmission member 40 and the apparatus 50 may be connected to each other via a connector. It is also applicable that the wire-like transmission member 40 is directly introduced in the apparatus 50 to be directly connected to an electrical element in the apparatus 50.

The apparatus 50 is an apparatus disposed on the roof 14 to be a connection destination of the wire-like transmission member 40. Assumed as the apparatus 50 are, for example, an electronic control unit, a lamp (particularly, a map lamp and an interior lamp), a speaker, an interior camera, a monitor, a projection apparatus, an external communication antenna, and an interior-side antenna.

The apparatus 50 is fixed to the functional sheet 30. A position of fixing the apparatus 50 to the functional sheet 30 is optionally set. The apparatus 50 is preferably fixed to a position appropriate for a role of the apparatus 50 on the functional sheet 30. For example, assuming that the apparatus 50 is a map lamp, the apparatus 50 is fixed to a portion of the functional sheet 30 which is to be disposed in an obliquely upper front position of a front seat. For example, assuming that the apparatus 50 is an interior-side antenna, the apparatus 50 is fixed to a portion of the functional sheet 30 which is to be disposed in an upper position of a front seat or a rear seat.

In the description herein, the apparatus 50 located closer to one side in a center position of the functional sheet 30 in a front-back direction is an electronic control unit 50A. The electronic control unit 50A is an apparatus controlling each apparatus 50 mounted to the roof 14 while communicating with the other electronic control unit provided in the vehicle 10. The apparatus mounted to the roof part in the apparatus 50 except for the electronic control unit 50A is an example of a roof-side apparatus. The wire-like transmission member 40 connecting an electronic control unit 50A and the other roof-side apparatus 50 in the wire-like transmission member 40 is an example of a first transmission member. A mounted state indicates that any of the roof panel 13, the interior member 16, and the functional sheet 30 is held to be kept in a constant position in the roof part.

In the description herein, the apparatus 50 located in a position closer to a front side in relation to a center of the functional sheet 30 is the interior-side antenna 50B. The interior-side antenna 50B is an antenna for performing wireless communication with an interior apparatus (a smartphone, a mobile phone, and a personal computer device), for example, in a vehicle. For example, the interior-side antenna 50B is a Wi-Fi (registered trademark) communication antenna and a Bluetooth (registered trademark) communication antenna. For example, a frequency band for the Wi-Fi communication is 2.4 GHz or 5 GHz, and a frequency band for the Bluetooth communication is 2.4 GHz.

The interior-side antenna 50B may be a non-contact power supply antenna performing a power supply to an interior apparatus in the vehicle in a non-contact form. The interior-side antenna 50B may be an antenna performing both wireless communication and a non-contact power supply to an interior apparatus in the vehicle. A frequency for the non-contact power supply is not particularly limited, but is determined by standards, for example. Applicable as the interior-side antenna 50B is a printed circuit antenna in which an antenna is formed on a circuit by a conductive foil, for example. The printed circuit may be flexible printed circuits (FPC). When the interior-side antenna 50B is made up as a printed circuit antenna, the interior-side antenna 50B is attached to the functional sheet 30 with a thin occupied space. When the printed circuit antenna is made up of the FPC, the occupied space is further thinned. A sheet-like antenna such as the FPC antenna can be easily deformed to follow a shape corresponding to a space where the antenna can be disposed. The interior-side antenna 50B may also be a rod antenna, for example.

In the description herein, the apparatus 50 located in a position closer to a rear side of the functional sheet 30 is an external communication antenna unit 50C. The external communication antenna unit 50C includes the antennas 53a and 53b for performing wireless communication with an apparatus located on the outer side of the vehicle. Herein, the external communication antenna unit 50C includes a base member 52, the external communication antennas 53a and 53b, and a cover 54. The base member 52 is formed into a flat shape, that is, a rectangular plate-like shape herein. The external communication antennas 53a and 53b are provided on the base member 52. The external communication antennas 53a and 53b are antennas for performing communication with a vehicle external apparatus. The external communication antennas 53a and 53b are antennas for performing communication with a wireless base station in a public communication line or a private communication line, antennas for vehicle-to-vehicle communication or road-to-vehicle communication, or antennas for receiving a GPS signal. The external communication antennas 53a and 53b are preferably antennas for vehicle-to-vehicle communication or road-vehicle communication or antennas for receiving a GPS signal. Generally, a frequency band for a public communication line or a private communication line is determined by provisions or standards of each country. A frequency band for vehicle-to-vehicle communication or road-vehicle communication is also determined by provisions or standards of each country. Herein, the plurality of external communication antennas 53a and 53b are mounted on the base member 53. Accordingly, the plurality of external communication antennas 53a and 53b are handled as one collected form. The external communication antenna unit may include only one antenna. The external communication antenna unit may include three or more antennas. The cover 54 is made up of resin, for example, and covers an upper side of the external communication antennas 53a and 53b and four sides around the external communication antennas 53a and 53b. The antenna hole 13h formed in the roof panel 13 is formed into a shape corresponding to an outer periphery of the cover 54. The cover 54 in the external communication antenna unit 50C is fitted into the antenna hole 13h formed in the roof panel 13. Accordingly, even when the roof panel 13 is made of metal, the external communication antennas 53a and 53b are not covered by metal, but can be directed outward.

Herein, the external communication antenna unit 50C is formed into a thin box-like shape. The external communication antenna unit may be formed into a fin-like shape or a rod-like shape. In this case, the external communication antenna unit formed into the fin-like shape or the rod-like shape may be inserted into a hole formed in the roof panel to protrude to an outer side of the roof panel. Accordingly, the external communication antenna can be easily exposed outside, and a favorable external communication can be achieved through the external communication antennas 53a and 53b. The external communication antenna is preferably incorporated into a fin-like or rod-like external communication antenna unit to be located outside the roof panel. The external communication antenna unit may be attached to the body 12.

In the description hereinafter, when the electronic control unit 50A, the interior-side antenna 50B, and the external communication antenna unit 50C need to be distinguished, reference signs 50A, 50B, and 50C are referenced, and when they need not be distinguished, they are collectively referred to as the apparatus 50 in some cases.

The plurality of wire-like transmission members 40 are disposed along a route from the electronic control unit 50A toward a front side and each of a plurality of routes from the electronic control unit 50A toward the apparatus 50. The wire-like transmission member 40 located along the route from the electronic control unit 50A toward the front side is fixed to the functional sheet 30 in a region of the functional sheet 30, thereby being held along a constant route. The wire-like transmission member 40 located along the route from the electronic control unit 50A toward the front side extends from a front part of the functional sheet 30 to the outer side. The wire-like transmission member 40 is disposed along an A pillar in a vehicle, for example, and connected to the other electronic control unit and a power source in the vehicle. That is to say, the wire-like transmission member 40 is electrically connected to a vehicle-side apparatus mounted on a vehicle side. A state where the wire-like transmission member 40 is electrically connected to the vehicle-side apparatus mounted on the vehicle side indicates that the wire-like transmission member 40 and the vehicle-side apparatus are connected in a state where at least one of a power transmission and communication can be performed therebetween. Thus, in any of cases where the electronic control unit 50A has a communication relay function and a power source-distribution function, the wire-like transmission member 40 and the vehicle-side apparatus are electrically connected to each other even when at least one of the electronic control unit 50A and a wiring 40E intervenes therebetween.

It is also applicable that a part of the wire-like transmission member 40 connected to the other electronic control unit and a power source in the vehicle from the electronic control unit 50A does not constitute the transmission member in the wiring module 20 but is considered as the other wiring 40E laid from the vehicle-side apparatus mounted to the vehicle side to the roof part. In such a case, the other wiring 40E is an example of a second transmission member extending from a position in the functional sheet 30 where the electronic control unit 50A is mounted to an outward direction of the functional sheet 30 and electrically connected to the vehicle-side apparatus. The wiring 40E needs not be attached to the functional sheet 30.

The plurality of wire-like transmission members 40 located along the plurality of routes from the electronic control unit 50A toward the plurality of apparatuses 50 is fixed to the functional sheet 30, thereby being held along a constant route. That is to say, the wire-like transmission member 40 is formed to extend to a position in the functional sheet 30 where the wire-like transmission member 40 can perform a power supply to or communication with the apparatus 50 which is the roof-side apparatus. The wire-like transmission member 40 may be held by the functional sheet 30 until it reaches each apparatus 50 or in a position before it reaches the apparatus 50. Routes of the plurality of wire-like transmission members 40 are optionally set. It is preferable that the routes of the plurality of wire-like transmission members 40 do not intersect with each other. When the routes of the plurality of wire-like transmission members 40 do not intersect with each other, increase in a thickness of the wiring module by an intersection part thereof is suppressed. A noise problem such as a crosstalk of a signal occurring in the intersection part is suppressed.

The wire-like transmission member 40 extending to the external communication antenna unit 50C including the external communication antennas 53a and 53b in the wire-like transmission members 40 is electrically connected to the vehicle-side apparatus via the electronic control unit 50A and the wiring 40E. This wire-like transmission member 40 extends to the external communication antenna unit 50C along the functional sheet 30 to be also electrically connected to the external communication antennas 53a and 53b. Thus, this wire-like transmission member 40 is an example of a transmission member electrically connecting the vehicle-side apparatus and the external communication antennas 53a and 53b. In the similar manner, the wire-like transmission member 40 extending to the interior-side antenna 50B in the wire-like transmission members 40 is an example of a transmission member electrically connecting the vehicle-side apparatus and the interior-side antenna 50B.

<Example of Functional Sheet>

Figure 4:
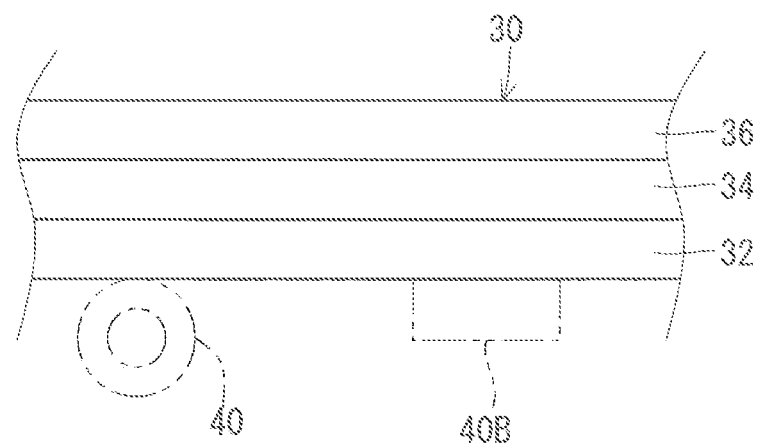
FIG. 4 is a schematic side view illustrating an example of a functional sheet.

FIG. 4 is a schematic side view illustrating an example of the functional sheet 30. The functional sheet 30 includes a heat insulating layer 32, an acoustic insulation layer 34, and a radio wave shielding layer 36. Herein, the functional sheet 30 includes a multilayer structure in which the heat insulating layer 32, the acoustic insulation layer 34, and the radio wave shielding layer 36 overlap with each other from a lower side to an upper side. An order of overlapping the heat insulating layer 32, the acoustic insulation layer 34, and the radio wave shielding layer 36 is optionally set. In a case where the functional sheet includes a plurality of functional layers, it is not necessary to arrange the plurality of functional layers to be overlapped in a thickness direction of the functional sheet. The plurality of functional layers may be provided in different regions in a region where the functional sheet extends. For example, the plurality of functional layers may be provided side by side in a region where the functional sheet extends. The radio wave shielding layer 36 may be provided on a lower side of the heat insulating layer 32. In this case, a thermal influence on the radio wave shielding layer 36 is reduced by the heat insulating layer 32. Accordingly, resin of a base material of the radio wave shielding layer 36 needs not have heat resistance, thus this configuration contributes to cost reduction.

The heat insulating layer 32 is a layer suppressing a heat transmission between one main surface and the other main surface of the functional sheet 30. The heat insulating layer 32 may be a layer reflecting heat radiation energy. The heat insulating layer 32 may be a layer having lower heat conductivity than the other layer. Specifically, a sheet including minute spaces such as a non-woven sheet or a foam sheet, for example, may be used as the heat insulating layer 32. A heat insulating coating or a heat shielding coating may be used as the heat insulating layer 32. The heat insulating layer 32 may be a metal foil. In this case, the heat insulating layer 32 made up of the metal foil is not provided in a region where radio wave is intended to be passed in the functional sheet 30.

The acoustic insulation layer 34 is a layer suppressing a sound transmission between one main surface and the other main surface of the functional sheet 30. The acoustic insulation layer 34 may reflect sound or absorb energy of sound as heat energy. Specifically, a sheet including minute spaces such as a non-woven sheet or a foam sheet, for example, may be used as the acoustic insulation layer 34. A sound absorbing coating may be used as the acoustic insulation layer 34.

Figure 5:
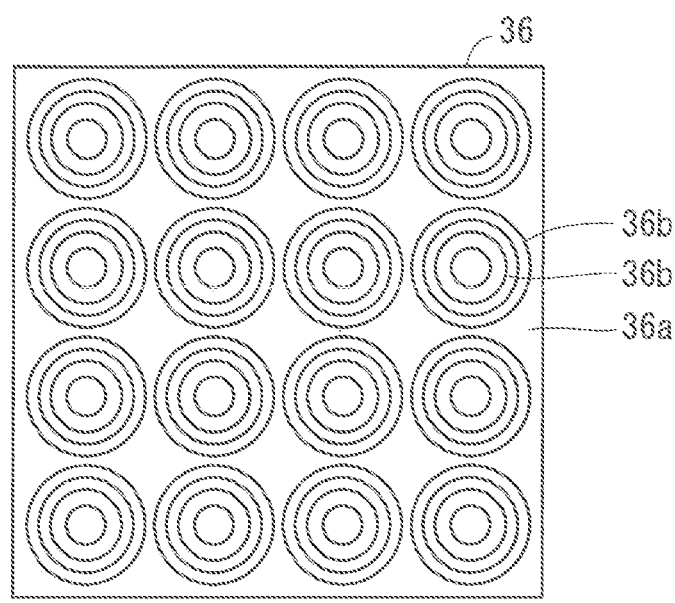
FIG. 5 is a diagram illustrating an example of a frequency selective surface.

The radio wave shielding layer 36 is a layer suppressing a radio wave transmission between one main surface and the other main surface of the functional sheet 30. The radio wave shielding layer 36 may have a radio wave shielding property on all of frequencies. The radio wave shielding layer 36 may have a selective radio wave shielding property on some frequency band. In this case, it is sufficient that at least one of reflection and absorption of radio wave of some frequency band is performed in the radio wave shielding layer. The radio wave shielding layer 36 may be a layer formed of metal such as aluminum or iron. A known frequency selective surface (FSS) may be used as the radio wave shielding layer 36 having the selective radio wave shielding property. FIG. 5 is a diagram illustrating an example of a frequency selective surface. The frequency selective surface has a configuration that a unit cell (element) 36b is formed by a metal foil on a base film 36a formed of resin, for example. FIG. 5 illustrates an example that two annular unit cells 36b having different sizes are concentrically disposed, and these two annular unit cells 36b are formed to be arranged in a matrix. Such a frequency selective surface has characteristics of selectively shielding radio wave of one or a plurality of frequency bands in accordance with a frequency property of the unit cell (cell) 36b, and passing radio wave of the other frequency band. The radio wave shielding layer having the selective radio wave shielding property may also be formed by directly printing a conductive paste on a heat insulating layer or an acoustic insulation layer, for example. In this case, the heat insulating layer or the acoustic insulation layer is a layer doing double duty as the radio wave shielding layer described above.

When the frequency band of the radio wave radiated from the interior-side antenna 50B is included in the frequency band shielded by the frequency selective surface, the radio wave is shielded by the frequency selective surface. When a frequency band of any radio wave radiated from the external communication antennas 53a and 53b is included in the frequency band shielded by the frequency selective surface, any radio wave radiated from the external communication antennas 53a and 53b is shielded by the frequency selective surface. When a frequency band of any radio wave radiated from the external communication antennas 53a and 53b is out of range of the frequency band shielded by the frequency selective surface, the radio wave for external communication passes through the frequency selective surface. When radio wave for external communication is out of range of the frequency band shielded by the frequency selective surface, the radio wave for external communication passes through the frequency selective surface. Such radio wave for external communication is appropriate for wireless communication between a vehicle-interior apparatus and an external apparatus.

When the radio wave shielding layer 36 has a selective radio wave shielding property on some frequency band, the radio wave shielding layer 36 may also be considered a member having a frequency selective property of shielding radio wave of a first frequency band and passing radio wave of a second frequency band different from the first frequency band. Herein, the first frequency band may be one frequency band or a plurality of frequency bands. The radio wave shielding layer 36 has the frequency selective property described above in a planarly-extended region. With regard to the property of the radio wave shielding layer 36 shielding the radio wave of the first frequency band, the radio wave of the first frequency band needs not be completely shielded. With regard to the property of the radio wave shielding layer 36 passing the radio wave of the second frequency band, the radio wave of the second frequency band needs not completely pass the radio wave shielding layer 36. That is to say, it is sufficient that the radio wave shielding layer 36 has a frequency selective property in which a transmission attenuation property is different between the first frequency band and the second frequency band. In the description hereinafter, when the radio wave shielding layer 36 having a selective radio wave shielding property on some frequency band is described, the first frequency band and the second frequency band described above are referenced in some cases.

The layers may simply overlap with each other. The layers may be fixed to each other by a double-sided tape, an adhesive agent, or welding, for example.

It is not necessary that the functional sheet 30 includes all of the heat insulating layer 32, the acoustic insulation layer 34, and the radio wave shielding layer 36. The functional sheet 30 may include some of the heat insulating layer 32, the acoustic insulation layer 34, and the radio wave shielding layer 36. That is to say, it is sufficient that the functional sheet 30 includes a layer having at least one of the heat insulation function, the acoustic insulation function, and the radio wave shielding function. One layer may have a plurality of functions. For example, the layer made up of a non-woven sheet can have a function as a heat insulating layer and an acoustic insulation layer.

When the radio wave shielding layer 36 has a selective radio wave shielding property, the wire-like transmission member 40 and the radio wave shielding layer 36 are preferably located away from each other. The reason is that there is a possibility that the wire-like transmission member 40 has an influence on a selective radio wave shielding property in the radio wave shielding layer 36. For example, as illustrated in FIG. 4, when the functional sheet 30 has a multilayer structure in which the heat insulating layer 32, the acoustic insulation layer 34, and the radio wave shielding layer 36 overlap with each other from one surface to the other surface (in FIG. 4, from a lower surface to an upper surface), the wire-like transmission member 40 is preferably provided on a surface on a side away from the radio wave shielding layer 36, that is to say, the one surface. The other additional function layer may intervene between the wire-like transmission member 40 and the radio wave shielding layer 36. When the radio wave shielding layer 36 is biasedly disposed on a side of one surface in a thickness direction of the functional sheet 30, the wire-like transmission member 40 may be provided on a side of the other surface of the functional sheet 30. FIG. 4 also illustrates a wire-like transmission member 40B formed into a quadrangular shape in cross section. The wire-like transmission member 40B may be an exposed conductor or has a configuration in which the conductor is covered by insulating resin, for example.

FIG. 6 is a cross-sectional view illustrating a state where the wire-like transmission member 40 is welded to a base material 39 constituting the functional sheet 30. The base material 39 may constitute any of the layers each constituting the functional sheet 30. The wire-like transmission member 40 is a general covering wire including a core wire 40a and a covering 40b. The covering 40b is formed by resin such as polyvinyl chloride (PVC) or polyethylene (PE), for example. A material constituting the base material 39 is not particularly limited as long as it can be welded to the covering 40b. Preferable is a material including resin such as polypropylene (PP) and polyethylene terephthalate (PET) other than PVC and PE described above, and more preferable is a material including the same resin as that constituting the insulating covering.

The wire-like transmission member 40 is welded to the base material 39 described above by ultrasonic welding, for example, thus the covering 40b is welded to the base material 39. Any of or both the base material 39 and the covering 40b may be melted.

<Fixing Structure of Apparatus Fixed to Functional Sheet>

An example of a fixing structure of the apparatus 50 fixed to the functional sheet 30 is described.

The apparatus 50 may be directly fixed to the functional sheet 30. The apparatus 50 may be fixed to the functional sheet 30 via an apparatus holder.

Figure 7:
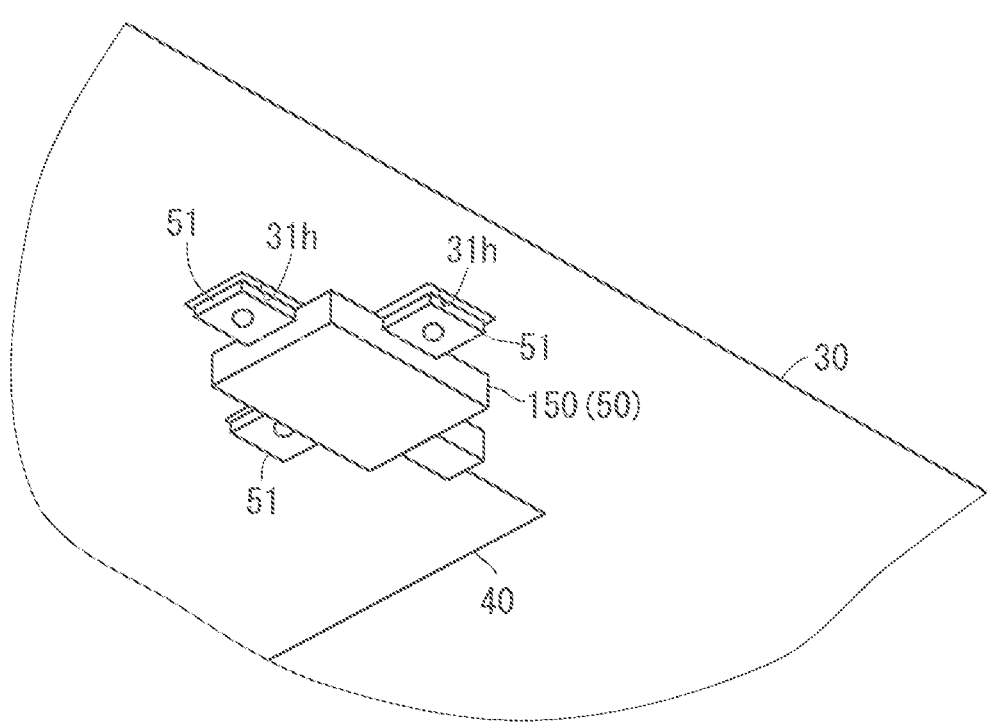
FIG. 7 is a perspective view illustrating a state where an apparatus is directly fixed to the functional sheet.

FIG. 7 is a perspective view illustrating a state where the apparatus 50 is directly fixed to the functional sheet 30. The apparatus directly fixed to the functional sheet 30 may be referred to as a direct fixation apparatus 150.

As illustrated in FIG. 3 and FIG. 7, the direct fixation apparatus 150 is directly fixed to one main surface of the functional sheet 30. Herein, a state where the direct fixation apparatus 150 is directly fixed to the functional sheet 30 indicates that the direct fixation apparatus 150 is fixed without an intervention of the other fixation holder, for example.

For example, the direct fixation apparatus 150 may be welded (also referred to as fused) to one main surface of the functional sheet 30. A welding part thereby formed has a configuration that a part of at least one of the direct fixation apparatus 150 and the functional sheet 30 is melted and adheres to the other side member. The direct fixation apparatus 150 and the functional sheet 30 may be welded by ultrasonic welding or thermal welding. It is also applicable that a surface of at least one of the direct fixation apparatus 150 and the functional sheet 30 is melted by a solvent to weld the direct fixation apparatus 150 and the functional sheet 30. For example, the direct fixation apparatus 150 may be fixed to the functional sheet 30 by an adhesive agent or a double-sided tape, for example. For example, the direct fixation apparatus 150 may be sewn to the functional sheet 30 by a sewing thread, for example. For example, a protrusion piece for sewing may be formed outside the direct fixation apparatus 150. It is sufficient that a hole is formed in the protrusion piece. The direct fixation apparatus 150 is sewn to the functional sheet 30 using this hole. It is also applicable that the functional sheet 30 is sandwiched between the direct fixation apparatus 150 and a fixation plate to fix the direct fixation apparatus 150 to the functional sheet 30. For example, the direct fixation apparatus 150 is disposed on a side of one main surface of the functional sheet 30, and a plate-like fixation plate is disposed on a side of the other main surface of the functional sheet 30. In this state, a screw passing through the functional sheet 30 secures the direct fixation apparatus 150 and the fixation plate in an approaching direction. Accordingly, the functional sheet 30 is sandwiched between the direct fixation apparatus 150 and the fixation plate.

The direct fixation apparatus 150 may be fixed to any of one main surface and the other main surface of the functional sheet 30. In FIG. 7, the direct fixation apparatus 150 is fixed to a surface on a lower side (a vehicle interior side) of the functional sheet 30. The direct fixation apparatus 150 is formed into a rectangular parallelepiped shape, for example. The direct fixation apparatus 150 is directly fixed to the surface on the lower side of the functional sheet 30 in a state where one main surface thereof has contact with the surface on the lower side of the functional sheet 30.

Herein, a fixing piece 51 for fixation to the roof 14 is provided to protrude from the direct fixation apparatus 150. A screw insertion hole for screw fixation is formed in the fixing piece 51. An opening 31h is formed in a position in the functional sheet 30 corresponding to the fixing piece 51. Thus, the fixing piece 51 can be overlapped with a side of a lower surface of the roof panel 13 in a state where the wiring module 20 is disposed between the roof panel 13 and the interior member 16. Accordingly, the fixing piece 51 can be easily fixed to the roof panel 13 with a screw, for example.

In the present embodiment, the interior-side antenna 50B and the external communication antenna unit 50C which are examples of the apparatus 50 are also directly fixed to the functional sheet 30 as with the case described above. The external communication antenna unit 50C is fixed to an upper surface of the functional sheet 30.

Figure 8:
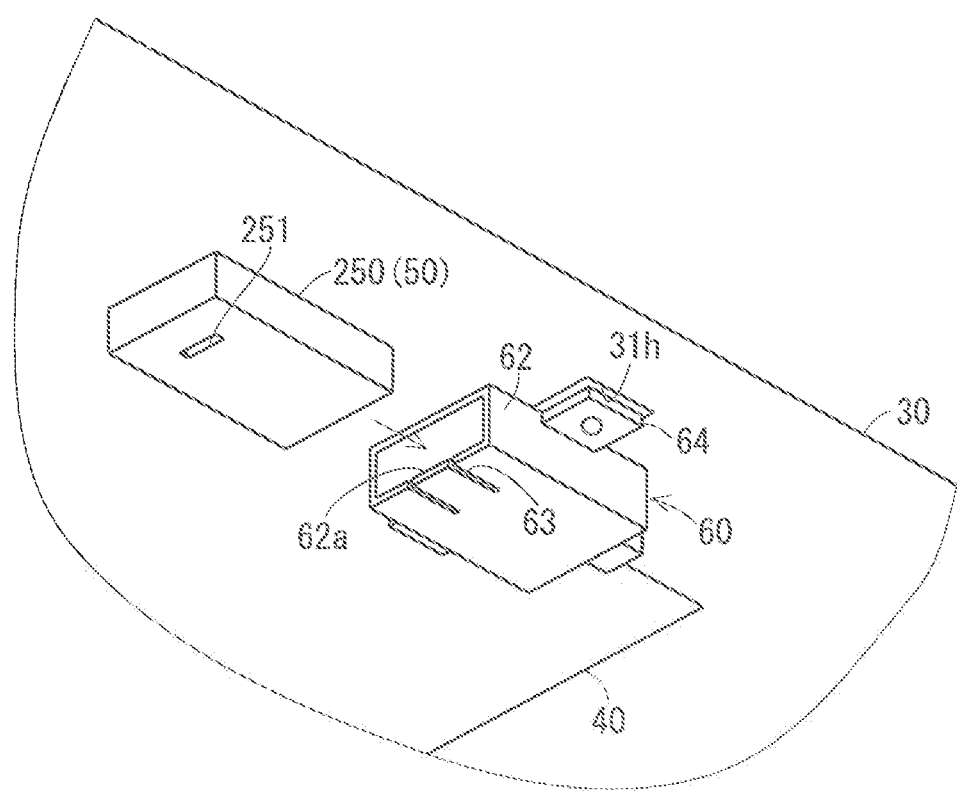
FIG. 8 is a perspective view illustrating a state where an apparatus is fixed to the functional sheet via an apparatus holder.
Figure 9:
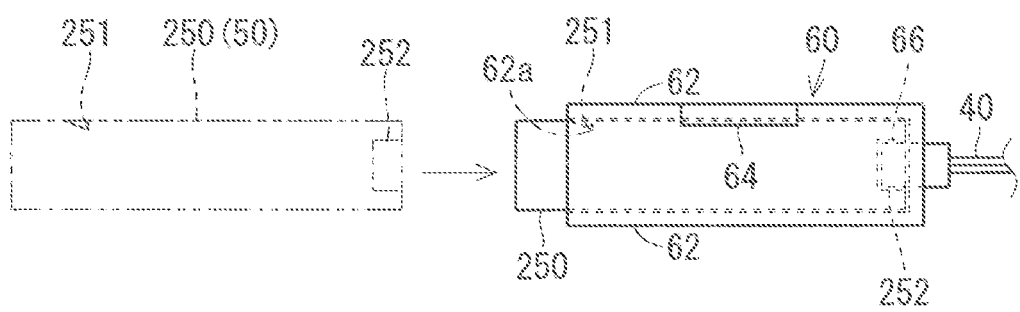
FIG. 9 is a side view illustrating an apparatus and an apparatus holder.

FIG. 8 is a perspective view illustrating a state where the apparatus 50 is fixed to the functional sheet 30 via an apparatus holder 60. FIG. 9 is a side view illustrating the apparatus 50 and the apparatus holder 60. An apparatus fixed to the functional sheet 30 via the apparatus holder 60 may be referred to as an indirect fixation apparatus 250.

The apparatus holder 60 is configured to be able to hold the indirect fixation apparatus 250 in a state of being fixed to the functional sheet 30. Herein, the apparatus holder 60 includes a holder body part 62 and a fixing piece 64.

The holder body part 62 is formed into a rectangular parallelepiped box-like shape with an opening on one end side by resin, for example. A space capable of partially or wholly housing the indirect fixation apparatus 250 is formed inside the holder body part 62. Herein, the indirect fixation apparatus 250 is formed into a rectangular parallelepiped shape. A rectangular parallelepiped space corresponding to an outer shape of the indirect fixation apparatus 250 is formed inside the holder body part 62.

A locking piece 63 which can be locked to the indirect fixation apparatus 250 is formed in the holder body part 62. Herein, an elongated groove-like concave part 251 is formed on an outer periphery of the indirect fixation apparatus 250. The locking piece 63 is formed in a part of an opening part of the holder body part 62. Both side parts of the locking piece 63 are separated from the other part of the holder body part 62. Accordingly, the locking piece 63 can be elastically deformed in an inward-outward direction of the holder body part 62 at a base end part thereof as a support position. A convex part 62a protruding toward an inner side of the holder body part 62 is formed on a tip part of the locking piece 63. When the indirect fixation apparatus 250 is inserted into the holder body part 62, the convex part 62a has contact with an outer surface of the indirect fixation apparatus 250, and the locking piece 63 is elastically deformed outward. When the indirect fixation apparatus 250 is inserted into a back side of the holder body part 62 so that the convex part 62a reaches the concave part 251, the locking piece 63 is elastically recovered to an original shape, and the convex part 62a is fitted in the concave part 251. Accordingly, the indirect fixation apparatus 250 is held in the holder body part 62 in a state of not coming out thereof. The holder body part 62 needs not necessarily have a locking structure by the locking piece 63. For example, the indirect fixation apparatus 250 may be held in the holder body part 62 by holding strength in connecting a connector. The indirect fixation apparatus 250 may be fixed to the holder body part 62 with a screw, for example.

A holder-side connector 66 is provided in the holder body part 62. The holder-side connector 66 is provided on the back side of the holder body part 62. The holder-side connector 66 is exposed to an outer side and an inner side of the holder body part 62. The wire-like transmission member 40 is introduced in the holder-side connector 66 from an outward part of the holder-side connector 66. In the holder-side connector 66, the wire-like transmission member 40 is connected to a terminal located in the holder-side connector 66. The terminal in the holder-side connector 66 is exposed in the holder body part 62.

An apparatus-side connector 252 which can be connected to the holder-side connector 66 is provided in a part of the indirect fixation apparatus 250 inserted into the back side of the holder body part 62. As described above, when the indirect fixation apparatus 250 is inserted into the holder body part 62, the apparatus-side connector 252 and the holder-side connector 66 are connected to each other. Thus, the apparatus holder 60 holds the apparatus 50 while electrically connecting the apparatus 50 to the wire-like transmission member 40.

The holder body part 62 is directly fixed to one main surface of the functional sheet 30 in the manner similar to the direct fixation apparatus 150 described above.

The fixing piece 64 is provided to protrude from the holder body part 62. The fixing piece 64 has a configuration similar to the fixing piece 51 provided in the direct fixation apparatus 150. An opening 31h is formed in a position in the functional sheet 30 corresponding to the fixing piece 64. Thus, the fixing piece 64 can be overlapped with a side of a lower surface of the roof panel 13 in a state where the wiring module 20 is disposed between the roof panel 13 and the interior member 16. Accordingly, the fixing piece 64 can be easily fixed to the roof panel 13 with a screw. The indirect fixation apparatus itself may also be fixed to the roof panel 13, for example, in a configuration using the holder.

As a configuration of attaching the apparatus 50 to the functional sheet 30, a configuration of attaching the direct fixation apparatus 150 to the functional sheet 30 and a configuration of attaching the indirect fixation apparatus 250 to the functional sheet 30 via the apparatus holder 60 may be combined. For example, the interior-side antenna 50B is formed into the sheet-like shape, thus may be directly fixed to the functional sheet 30 without an intervention of the apparatus holder 60.

It is preferable that the apparatus 50 and the apparatus holder 60 are finally fixed to the roof panel 13 or the interior member 16, for example. Thus, it is sufficient that the apparatus 50 and the apparatus holder 60 are fixed to the functional sheet 30 at an intensity large enough to be able to keep a constant position on the functional sheet 30 in a state before being fixed to the roof panel 13, for example.

The apparatus 50 needs not necessarily be fixed to the functional sheet 30. For example, a wiring module including the functional sheet 30 and the wire-like transmission member 40 may be incorporated into a roof part separately from the apparatus 50.

<Arrangement Relationship of Apparatus on Functional Sheet>

Figure 10:
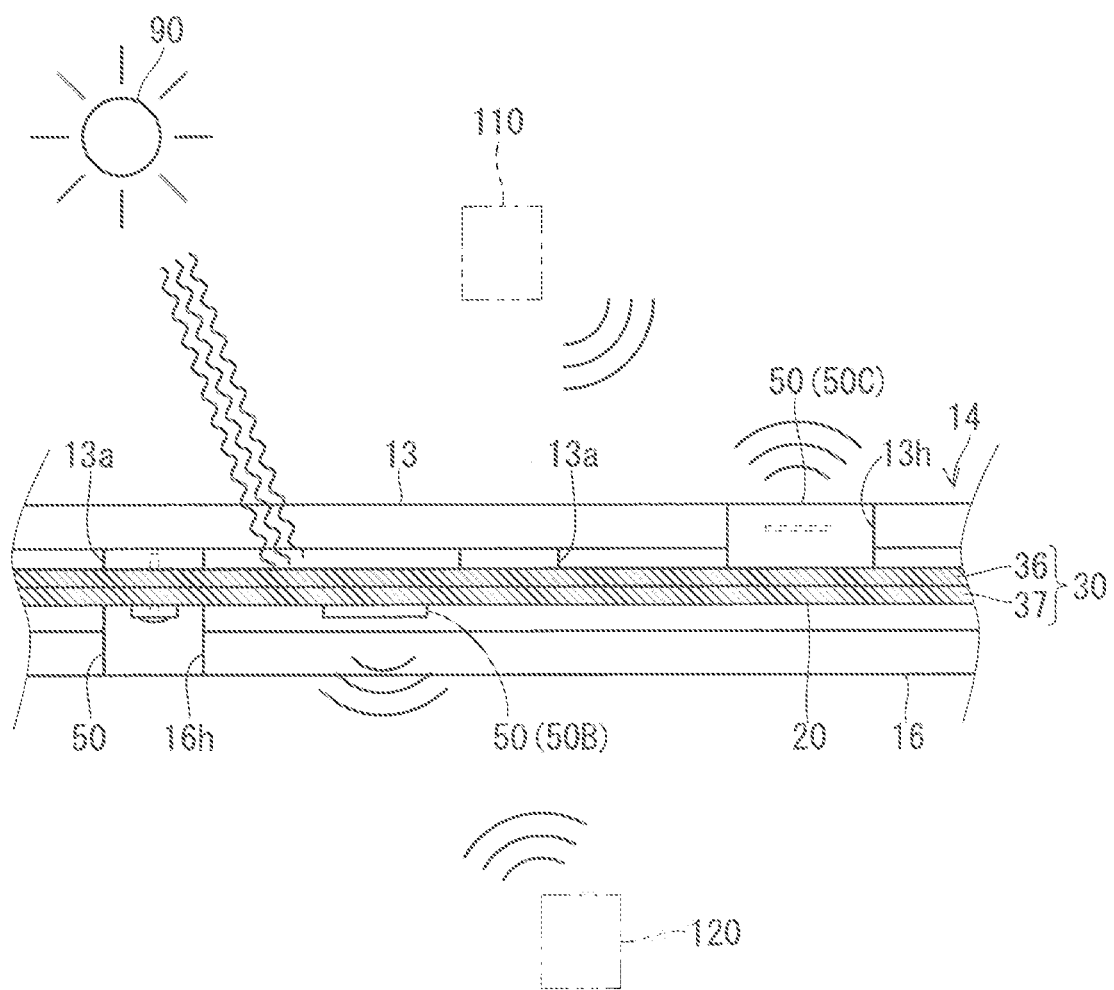
FIG. 10 is an explanation view illustrating the wiring module incorporated into a roof.

An arrangement example of the apparatus 50 on both surfaces of the functional sheet 30 is described. FIG. 10 is an explanation view illustrating the wiring module 20 incorporated into the roof 14.

In FIG. 10, a reinforcement bar 13a is provided on a vehicle interior side of the roof panel 13. The reinforcement bar 13a is also referred to as a stay in some cases. The apparatus 50 of the wiring module 20 is fixed to the reinforcement bar 13a with a screw. The apparatus 50 may be fixed to the interior member 16. The apparatus 50 may not be fixed to the roof panel 13 and the interior member 16. The apparatus 50 may be fixed to the roof 14 by an adhesive tape, a double-sided tape, welding, and a locking structure, for example.

When the apparatus 50 is a monitor, for example, the apparatus 50 is required to be exposed to the vehicle interior.

In this case, the apparatus 50 is fitted in a hole 16h formed in the interior member 16 to be able to be exposed to the vehicle interior. When the apparatus 50 is the electronic control unit 50A, for example, the apparatus 50 needs not be exposed to the vehicle interior, but may be housed between the interior member 16 and the roof panel 13.

The functional sheet 30 is disposed between the interior member 16 and the roof panel 13. The functional sheet 30 may be fixed to the interior member 16, for example, or may also be simply located on the interior member 16. For example, the functional sheet 30 may be fixed to the interior member 16 by a double-sided tape, an adhesive agent, or welding. FIG. 10 exemplifies the functional sheet 30 as a layer including the radio wave shielding layer 36 and an additional function layer 37. Herein, the radio wave shielding layer 36 is overlapped with an upper side of the additional function layer 37. The additional function layer 37 is a layer adding a function different from the radio wave shielding function to the functional sheet 30. For example, the additional function layer 37 is a layer adding at least one of the heat insulation function and the acoustic insulation function. The additional function layer 37 may have a single layer structure or a multilayer structure.

Based on a premise that the wiring module 20 includes the radio wave shielding layer 36, the external communication antenna unit 50C including the external communication antennas 53a and 53b is preferably provided on a vehicle exterior side of the radio wave shielding layer 36. That is to say, the external communication antennas 53a and 53b radiating the radio wave of the first frequency band may be provided on the vehicle exterior side of the radio wave shielding layer 36. Accordingly, the radio wave radiated from the external communication antennas 53a and 53b is shielded by the radio wave shielding layer 36, and is hardly transmitted to the inner side of the vehicle. The radio wave radiated from the external communication antennas 53a and 53b is not shielded by the radio wave shielding layer 36, but is transmitted to the outer side. Thus, the wireless communication with an external apparatus 210 (a base station, for example) via the external communication antennas 53a and 53b is favorably performed. The radio wave is not transmitted to the inner side of the vehicle, thus radiation efficiency of the radio wave to the outer side of the vehicle increases. Also from this point, the wireless communication with the external apparatus 210 (a base station, for example) via the external communication antennas 53a and 53b is favorably performed.

In this case, the radio wave shielding layer 36 may also be a frequency selective surface shielding some radio wave radiated from the external communication antennas 53a and 53b. Accordingly, the radio wave mainly used for vehicle external communication in the radio wave radiated from the external communication antennas 53a and 53b is shielded by the radio wave shielding layer 36, and is hardly transmitted to the inner side of the vehicle. For example, it is sufficient that the radio wave of the frequency band for vehicle-to-vehicle communication or road-vehicle communication is shielded by the frequency selective surface.

The radio wave also used for communication between the inner side and the outer side of the vehicle in the radio wave radiated from the external communication antennas 53a and 53b is not shielded by the radio wave shielding layer 36, but is easily transmitted to the inner side of the vehicle. That is to say, the second frequency band described above which is not shielded by the radio wave shielding layer 36 may be set to overlap with at least part of the frequency band for external communication. For example, it is sufficient that the frequency band of the radio wave used for a public communication line or a private communication line between an interior apparatus (a smartphone, a mobile phone, or a personal computer device, for example) which may be used by a passenger in the vehicle and an external apparatus is set to be out of range of the frequency band shielded by the frequency selective surface.

In this case, the radio wave radiated from the interior apparatus is not shielded by the radio wave shielding layer 36, but can be transmitted to the outer side of the vehicle. The radio wave of the same frequency band from outside is not also shielded by the radio wave shielding layer 36, but is transmitted to the inner side of the vehicle. Thus, the interior apparatus can favorably perform wireless communication with a wireless base station on the outer side of the vehicle using a public communication line or a private communication line.

When the roof panel 13 is formed of metal, for example, it is sufficient that the antenna hole 13h is formed in the roof panel 13, and the external communication antennas 53a and 53b are disposed in positions corresponding to the antenna hole 13h. Herein, the external communication antenna unit 50C is fitted in the antenna hole 13h. Accordingly, the external communication antennas 53a and 53b are disposed in the antenna hole 13h when viewing the antenna hole 13h from the outer side. Thus, the external communication antennas 53a and 53b can be directed to the outer side of the vehicle via the antenna hole 13h, and can favorably perform wireless communication with a communication apparatus 110 (such as a base station) on the outer side of the vehicle.

When the roof panel 13 is formed of resin, for example, the antenna hole 13h needs not be formed in the roof panel 13 for the external communication antennas 53a and 53b. The external communication antenna 53a may be disposed on the inner side of the roof panel 13 formed of resin, for example.

Even in a case where the roof panel 13 is formed of metal, for example, when a sun roof is formed in the roof panel 13, the external communication antenna may perform wireless communication with an external apparatus via an opening for the sun roof.

In the present embodiment, the wire-like transmission member 40 is fixed to the vehicle interior side of the functional sheet 30, and the external communication antenna unit 50C is fixed to the vehicle exterior side of the functional sheet 30. In this case, the following configuration is also applicable. Firstly, a through hole 30b passing through front and back sides of the functional sheet 30 is formed. An end portion of the wire-like transmission member 40 fixed to the vehicle interior side of the functional sheet 30 is passed through the through hole 30b which is an example of a passing part, and is led to the surface of the functional sheet 30 on the vehicle exterior side. Then, a connector on the end portion of the wire-like transmission member 40 is connected to the external communication antenna unit 50C at an outer side of the surface of the functional sheet 30 on the vehicle exterior side. Accordingly, the wire-like transmission member 40 can be connected to the apparatus 50 at both surfaces of the functional sheet 30.

Based on a premise that the wiring module 20 includes the radio wave shielding layer 36, the interior-side antenna 50B is preferably provided on the vehicle interior side of the radio wave shielding layer 36. Accordingly, the radio wave radiated from the interior-side antenna 50B and an interior apparatus 120 in the vehicle is shielded by the radio wave shielding layer 36, and is hardly transmitted to the vehicle exterior side. In this case, the radio wave shielding layer 36 may also be a frequency selective surface shielding the radio wave radiated from the interior-side antenna 50B. In other words, when the radio wave shielding layer 36 has the frequency selective property of shielding the first frequency band, the interior-side antenna 50B radiating the radio wave of the first frequency band which is shielded may be provided on the vehicle interior side of the radio wave shielding layer 36.

Accordingly, the radio wave used by the interior-side antenna 50B for wireless communication is shielded by the radio wave shielding layer 36, and is hardly transmitted to the vehicle exterior side. In the meanwhile, the radio wave radiated from the interior-side antenna 50B is transmitted to the vehicle interior side on an opposite side of the interior-side antenna 50B from the radio wave shielding layer 36. Thus, the wireless communication with the interior apparatus 120 can be favorably performed through the interior-side antenna 50B. When the interior-side antenna 50B performs a non-contact power supply to an interior apparatus, the radio wave (electrical power) is not leaked to the outer side of the vehicle, thus the non-contact power supply is efficiently performed. For example, there is a possibility that the interior apparatus 120 such as a smartphone performs wireless communication with an external apparatus via a public communication line or a private communication line. When the frequency band of the radio wave used in the public communication line or the private communication line is out of the frequency band shielded by the frequency selective surface, the interior apparatus 120 can favorably perform the wireless communication with a communication apparatus (such as a base station) on the outer side of the vehicle.

As described above, assumed is that the external communication antennas 53a and 53b are provided on the vehicle exterior side of the functional sheet 30, and the interior-side antenna 50B is provided on the vehicle interior side thereof. In this case, for example, the frequency band of the radio wave shielded by the frequency selective surface may be set to shield some radio wave radiated from the external communication antennas 53a and 53b and the radio wave radiated from the interior-side antenna 50B. Furthermore, the frequency band of the radio wave shielded by the frequency selective surface may be set to allow the transmission of the remaining radio wave radiated from the external communication antennas 53a and 53b. Accordingly, the leakage of the radio wave for vehicle interior communication to the outer side of the vehicle is suppressed as much as possible. Some radio wave for vehicle external communication (such as vehicle-to-vehicle communication or road-vehicle communication) can be hardly transmitted to the vehicle interior side, and the remaining radio wave on the outer side of the vehicle (such as a public communication line) can be easily transmitted to the vehicle interior side.

The interior-side antenna 50B is relatively thin and light in weight, thus it is sufficient that the interior-side antenna 50B is fixed only to the functional sheet 30, and needs not be fixed to the interior member 16.

Based on a premise that the wiring module 20 includes the heat insulating layer 32, the apparatus 50 preferably includes a vehicle interior-side apparatus provided on the inner side of the vehicle in relation to the heat insulating layer 32. Assumed herein is that the apparatus 50 except for the external communication antenna unit 50C in the plurality of apparatuses 50 is the vehicle interior side apparatus.

There is a possibility that a temperature of the roof 14 increases when the roof 14 is irradiated with light from the sun 90. Heat by sunlight is blocked by the heat insulating layer 32, thus a temperature of an area on the vehicle interior side of the heat insulating layer 32 hardly increases compared with an area on the vehicle exterior side. Thus, when the apparatus 50 is provided in the area on the vehicle interior side of the heat insulating layer 32, increase in a temperature around the apparatus 50 can be suppressed. As a result, a member having high heat resistance needs not be used as the apparatus 50.

In the similar manner, when the wire-like transmission member 40 is provided in the area on the vehicle interior side of the heat insulating layer 32, increase in a temperature of the wire-like transmission member 40 can be suppressed. Thus, a member having high heat resistance needs not be used as the wire-like transmission member 40.

Effect Etc. of Embodiments

According to the wiring module 20 having such a configuration, the functional sheet 30, the wire-like transmission member 40, and the apparatus 50 can be collectively incorporated into a vehicle easily. The wire-like transmission member 40 and the apparatus 50 planarly extend over the functional sheet 30 and are integrated with each other, thus the wiring module 20 can be thinned. This configuration can contribute to increase in an interior space. Change, addition, and omission of the apparatus 50 and change (including route change), addition, and omission of the wire-like transmission member 40 fixed to the functional sheet 30 can be performed relatively easily. Thus, this configuration can easily deal with change of an apparatus incorporated into a vehicle, for example.

Particularly, the apparatus 50 is fixed to a predetermined arrangement position in the functional sheet 30, and the wire-like transmission member 40 is fixed to the functional sheet 30 along a route to be able to connect each apparatus 50. Thus, when the wiring module 20 is incorporated into the vehicle 10, each apparatus 50 can be disposed in a predetermined position and the wire-like transmission member 40 can be disposed along a route to be able to connect each apparatus 50. Thus, an operation of arranging each apparatus 50 in a predetermined position one by one and an operation of arranging the wire-like transmission member 40 along a vehicle are unnecessary.

Particularly, the electronic control unit 50A is provided on the functional sheet 30, thus the electronic control unit 50A controlling the roof-side apparatus 50 is easily incorporated into the roof part together with the functional sheet 30.

Even in a case where the apparatus 50 is not fixed to the functional sheet 30, the wire-like transmission member 40, which is formed to extend to a position where the wire-like transmission member 40 can perform a power supply to or communication with the apparatus 50 in a state where the functional sheet 30 and the wire-like transmission member 40 are incorporated into the roof part, can be easily connected to the apparatus 50. Thus, also in this case, the effect similar to that described above is obtained.

The roof 14 is a member extending relatively widely in the vehicle 10. The functional sheet 30 is disposed on the roof 14, thus the functional sheet 30, the wire-like transmission member 40, and the apparatus 50 can be collectively incorporated into the roof 14 easily.

The direct fixation apparatus 150 is directly fixed to the functional sheet 30. Thus, the direct fixation apparatus 150 can be simply fixed to the functional sheet 30 without using the other member such as a holder.

The indirect fixation apparatus 250 is fixed to the functional sheet 30 via the apparatus holder 60. The indirect fixation apparatus 250 is attached to and detached from the apparatus holder 60, thus the indirect fixation apparatus 250 can be easily exchanged and maintenance thereof can be performed easily. The indirect fixation apparatus 250 can be subsequently added to the apparatus holder 60 easily. At least one of the electronic control unit 50A and the roof-side apparatus 50 can be electrically connected to the wire-like transmission member 40 easily using the apparatus holder 60.

The external communication antenna unit 50C including the interior-side antenna 50B, the external communication antennas 53a and 53b as the apparatus 50 is fixed to the functional sheet 30. Thus, the antennas 50B, 53a, and 53b can be easily incorporated into the vehicle 10 (the roof 14 herein). The external communication antenna unit 50C is fixed to the functional sheet 30, thus the external communication antenna unit 50C is also incorporated into the roof panel 13 easily.

The external communication antenna unit 50C including the external communication antennas 53a and 53b is fitted into the antenna hole 13h formed in the roof panel 13 which is a part of the body 12. Accordingly, the external communication antennas 53a and 53b are disposed in positions corresponding to the antenna hole 13h. Thus, the external communication antennas 53a and 53b are easily incorporated into the roof 14 to be directed to the outer side of the roof panel 13.

The functional sheet 30 includes at least one of the heat insulating layer 32, the acoustic insulation layer 34, and the radio wave shielding layer 36, thus at least one of the heat insulation function, the acoustic insulation function, and the radio wave shielding function is achieved by the functional sheet 30.

Particularly, when the functional sheet 30 includes the radio wave shielding layer 36, the radio wave is shielded on the inner side and the outer side of the vehicle. Accordingly, the radio wave in the vehicle is hardly transmitted to the outer side of the vehicle, and information security can be improved. The radio wave on the outer side of the vehicle is hardly transmitted to the inner side of the vehicle, thus noise can be reduced in the vehicle. When the wire-like transmission member 40 is provided on the radio wave shielding layer 36 on the inner side of the vehicle, influence of noise from the outer side of the vehicle can be reduced in the wire-like transmission member 40. The radio wave shielding layer 36 is particularly effective in a case where the roof panel 13 is formed of resin, for example. Even when the roof panel 13 is formed of metal, there is a case where a hole for attaching the external communication antenna, a hole for a sun roof, and a hole through which radio wave is leaked are formed in the roof panel 13, thus the function of shielding the radio wave as described above is effective.

When the interior-side antenna 50B is provided on the vehicle interior side of the radio wave shielding layer 36, the radio wave from the interior-side antenna 50B is hardly leaked to the outer side of the vehicle. The interior-side antenna 50B can radiate the radio wave to the inner side of the vehicle without problem.

When the external communication antennas 53a and 53b are provided on the vehicle exterior side of the radio wave shielding layer 36, the radio wave from the external communication antennas 53a and 53b is not shielded by the radio wave shielding layer, but is radiated to the outer side of the vehicle.

A vehicle interior-side apparatus is located on the vehicle interior side of the heat insulating layer 32, thus increase in a temperature of the vehicle interior-side apparatus by sunlight from the outer side of the vehicle, for example, is prevented. Heat is hardly transmitted between the outer side and the inner side of the vehicle by the heat insulating layer 32. Accordingly, an air conditioner can be effectively operated, and a battery consumption of a vehicle can be suppressed. When the vehicle 10 is driven by electrical power of a battery, an electrical power cost can be improved.

When the radio wave shielding layer 36 has the frequency selective property, the radio wave shielding layer 36 can shield the radio wave of the first frequency band. The radio wave of the second frequency band can pass through the radio wave shielding layer 36. Thus, a communication environment in the vehicle 10 can be improved.

Particularly, the radio wave shielding layer 36 is provided in a region overlapping with the roof panel 13. The roof panel 13 extends relatively widely on an upper side portion of the vehicle 10. The radio wave shielding layer 36 overlaps with the roof panel 13, thus the radio wave shielding layer 36 can efficiently shield the radio wave of the first frequency band.

The interior-side antenna 50B radiating the radio wave of the first frequency band is provided on the vehicle interior side of the radio wave shielding layer 36. In this case, the radio wave radiated from the interior-side antenna 50B is shielded by the radio wave shielding layer 36, and is hardly leaked to the outer side of the vehicle. Accordingly, information security can be improved. Suppressed is that the radio wave radiated from the interior-side antenna 50B becomes noise in the outer side of the vehicle.

The external communication antennas 53a and 53b radiating the radio wave of the first frequency band is provided on the outer side of the vehicle on the radio wave shielding layer 36. In this case, at least some radio wave radiated from the external communication antennas 53a and 53b is shielded by the radio wave shielding layer 36, and hardly passes to the inner side of the vehicle, thus reduction in noise can be achieved in the vehicle.

The second frequency band which is not shielded by the radio wave shielding layer 36 is set to overlap with at least part of the frequency band for external communication. Thus, an apparatus in the vehicle can favorably communicate with an external apparatus using radio wave overlapping with the second frequency band in a frequency band for external communication.

FIG. 11 is a schematic perspective view illustrating a wiring module 20B according to a modification example. As illustrated in FIG. 11, the wire-like transmission member 40 and the apparatus 50 may be provided on an upper side of the functional sheet 30, that is to say, a side of the roof panel 13 between the roof panel 13 and the interior member 16. The interior-side antenna 50B may be provided on a lower side of the functional sheet 30, that is to say, a side of the interior member 16 between the roof panel 13 and the interior member 16. In this case, it is sufficient that the wire-like transmission member 40 passes through the functional sheet 30 to be connected to the interior-side antenna 50B.

The external communication antenna unit 50C may be omitted. In this case, it is sufficient that a connector 48 is provided on an end portion of the wire-like transmission member 40 connected to the external communication antenna unit. The external communication antenna unit is assumed to be an external communication antenna unit 49 attached to a roof panel, for example (an external communication antenna unit formed into a fin-like shape or a rod-like shape, for example). It is sufficient that the connector 48 is connected to the external communication antenna unit 49 when the present wiring module 20B is incorporated into the roof in the vehicle 10. Accordingly, also in a case where the external communication antenna is separated from the functional sheet 30 and incorporated into the roof panel 13, the wire-like transmission member 40 is easily connected to the external communication antenna via the connector 48.

Embodiment 2

Figure 12:
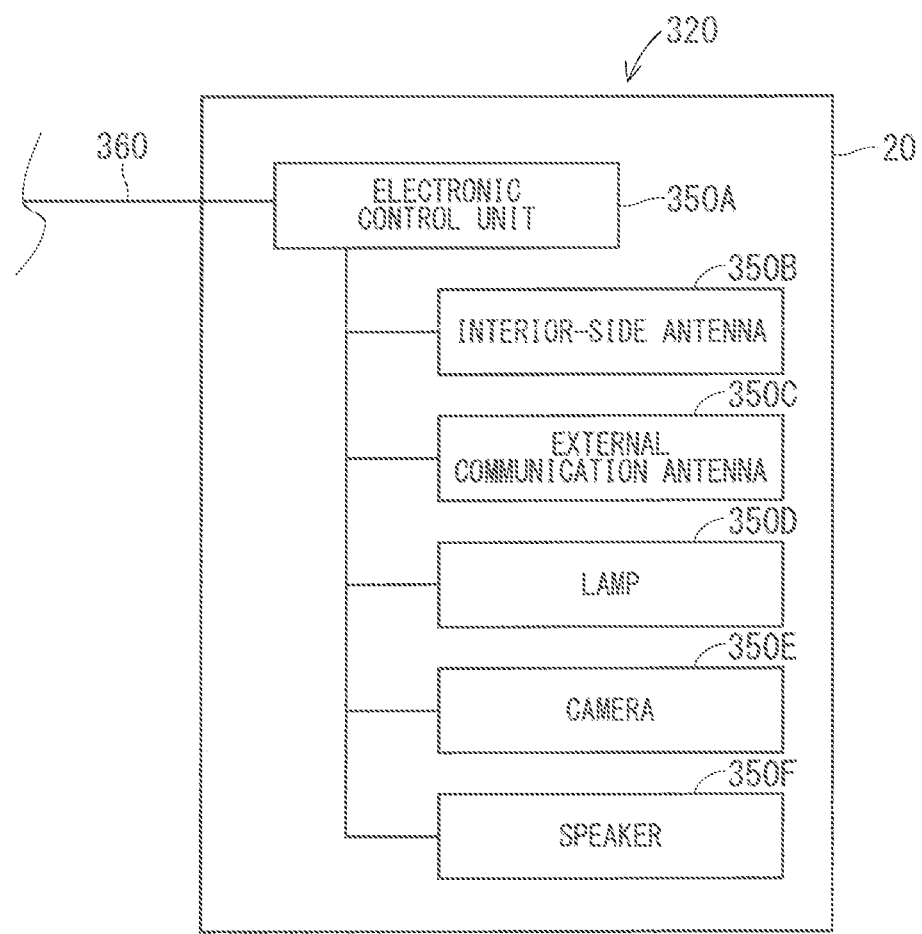
FIG. 12 is a functional block diagram according to the wiring module.
Figure 13:
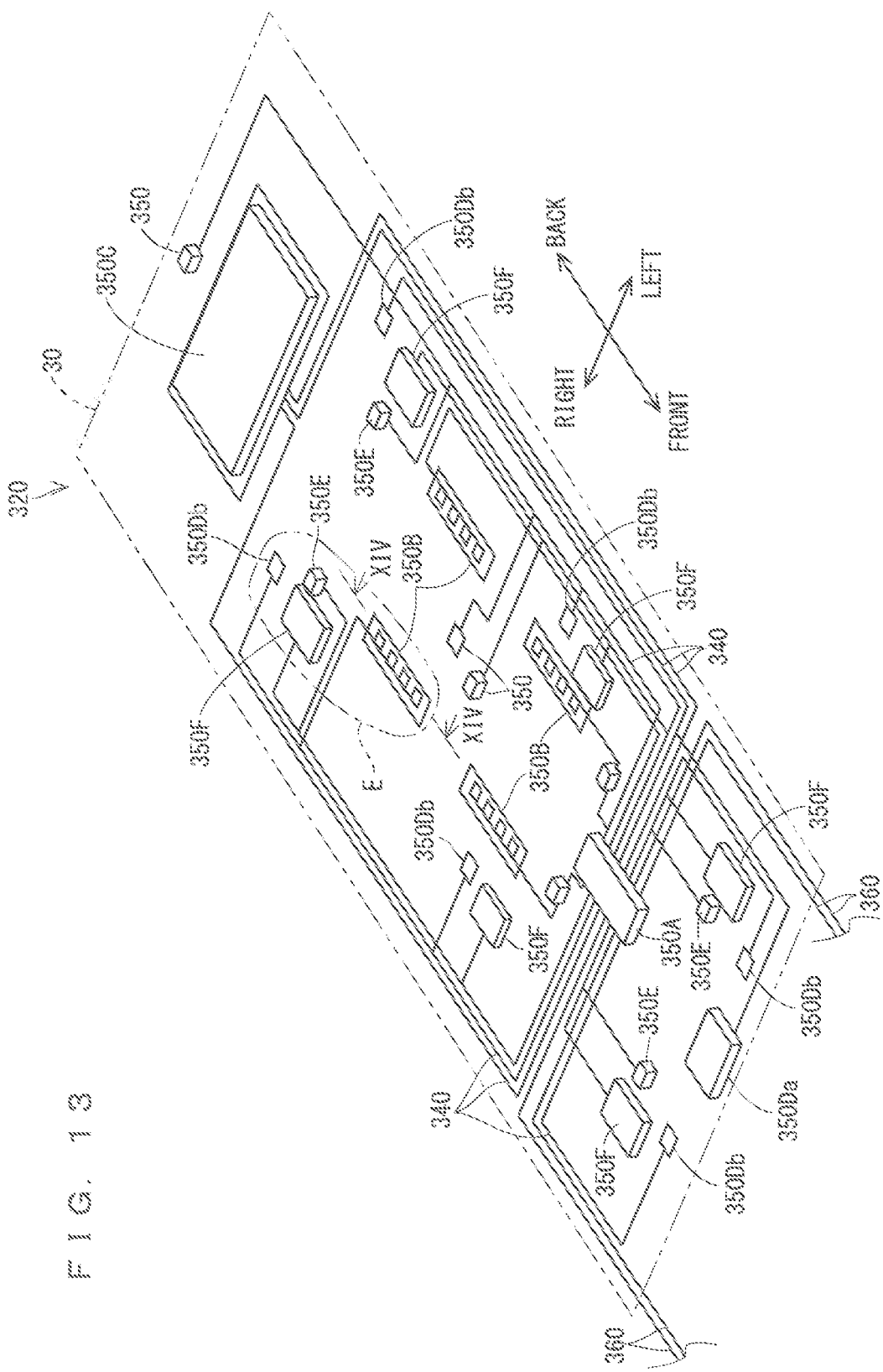
FIG. 13 is a schematic perspective view illustrating the wiring module.

A wiring module 320 according to an embodiment 2 is described. In the following description of the present embodiment 2, the same reference numerals are assigned to the similar constituent elements described in the embodiment 1, and the description thereof will be omitted. FIG. 12 is a functional block diagram according to the wiring module 320. FIG. 12 illustrates representative functional parts regardless of the number of functional parts. FIG. 13 is a schematic perspective view illustrating the wiring module 320. FIG. 13 illustrates schematic routes of a first transmission member 340 and a second transmission member 360, and there may be a case where each of them includes a plurality of electrical wires even when it is illustrated as a single wire.

The wiring module 320 includes a plurality of apparatuses 350 provided on the functional sheet 30 and the first transmission member 340.

The plurality of apparatuses 350 include an electronic control unit 350A, an interior-side antenna 350B, an external communication antenna 350C, a lamp 350D, a camera 350E, and a speaker 350F. The apparatus in the plurality of apparatuses 350 except for the electronic control unit 350A is an example of a roof-side apparatus mounted to a roof part. The external communication antenna 350C may be a single antenna, or may also be an antenna unit in which a plurality of antennas are combined.

The electronic control unit 350A is a computer including a processor and a memory, for example, and executes control processing in accordance with a program which is previously stored. The electronic control unit 350A is assumed to be an area electronic control unit (ECU) controlling various apparatuses provided on the roof, for example. The electronic control unit 350A is connected to the vehicle-side apparatus via the second transmission member 360. The vehicle-side apparatus is assumed to be the other electronic control unit (for example, a body ECU or a central ECU). The vehicle-side apparatus may be a power source device. The second transmission member 360 includes at least a communication line. The electronic control unit 350A is communicably connected to the vehicle-side apparatus via the second transmission member 360.

The electronic control unit 350A is communicably connected to the other apparatus provided on the roof such as the interior-side antenna 350B, the external communication antenna 350C, the lamp 350D, the camera 350E, and the speaker 350F, for example, via the first transmission member 340. The first transmission member 340 includes at least a communication line. The electronic control unit 350A can control the other apparatuses 350B, 350C, 350D, 350E, and 350F provided on the roof via the first transmission member 340. In FIG. 13, the lamp 350D is distinguished into a map lamp 350Da and the other lamp 350db.

The first transmission member 340 may include a power source line. The second transmission member 360 may include a power source line. The power source line included in the first transmission member 340 may be directly connected to a power source line included in the second transmission member. The power source line included in the first transmission member 340 may be connected to a power source line included in the second transmission member via a power source branch box, for example. The power source branch box is a device into which a branch circuit made up of a bus bar and a circuit shielding component made up of a fuse or a semiconductor element, for example, are incorporated. The power source branch box may be incorporated into the electronic control unit 350A. In this case, the second transmission member 360 including a signal line and a power source line is collectively connected to the electronic control unit 350A, and divided in the electronic control unit 350A in accordance with the apparatuses 350B, 350C, 350D, 350E, and 350F, for example. The electronic control unit 350A is connected to the apparatuses 350B, 350C, 350D, 350E, and 350F to be able to communicate with and supply electrical power to them via the first transmission member 340 including the signal line and the power source line. The second transmission member 360 needs not be attached to the functional sheet 30.

Positions of each apparatus 350 and the first transmission member 340 in the functional sheet 30 are optionally set. In the example illustrated in FIG. 13, the electronic control unit 350A and the map lamp 350Da are provided in a central region in a width direction closer to a front side in the functional sheet 30. The map lamp 350Da is provided in a region closer to a front side in relation to the electronic control unit 350A. The external communication antenna 350C is provided in a central region in a width direction closer to a back side in the functional sheet 30. A direction in which the vehicle travels is the front side, and an opposite direction thereof is the back side. Right and left sides are defined based on a state of being directed to the front side. The electronic control unit 350A may be biasedly provided on the right side or the left side of the functional sheet 30.

The apparatus 350 includes an apparatus provided in a region closer to the left side of the functional sheet 30 and an apparatus provided in a region closer to the right side of the functional sheet 30.

For example, the plurality of (four in FIG. 13) cameras 350E are provided separately in the region closer to the left side and the region closer to the right side of the functional sheet 30. In each of the right and left regions, the plurality of (two in FIG. 13) cameras 350E are provided separately in the front and back sides. For example, the plurality of (six in FIG. 13) speakers 350F are provided separately in the region closer to the left side and the region closer to the right side of the functional sheet 30. In each of the right and left regions, the plurality of (three in FIG. 13) speakers 350F are provided separately in the front and back sides. Furthermore, for example, the plurality of (six in FIG. 13) lamps 350D are provided separately in the region closer to the left side and the region closer to the right side of the functional sheet 30. In each of the right and left regions, the plurality of (three in FIG. 13) lamps 350D are provided separately in the front and back sides.

The camera 350E and the lamp 350D are provided around the speaker 350F on a forefront side, the lamp 350D is provided around the speaker 350F in a middle portion in a front-back direction, and the camera 350E and the lamp 350D are provided around the speaker 350F on a rearmost side in each of the right and left regions in the functional sheet 30.

The plurality of interior-side antennas 350B are provided separately on the right and left sides of the functional sheet 30. Herein, the plurality of interior-side antennas 350B are provided in a region closer to a back side in relation to the electronic control unit 350A and closer to a front side in relation to the external communication antenna 350C. The plurality of (four in FIG. 13) interior-side antennas 350B are provided separately on the right and left sides, and also provided separately on the front and back sides. More specifically, the plurality of interior-side antennas 350B are disposed in regions corresponding to seats, respectively, more specifically, in positions on upper sides of a driver seat, a passenger seat, and seating positions on right and left sides in a rear seat. The interior-side antenna 350B is used for a non-contact power supply (Wi-Fi (registered trademark) supply), for example.

Each apparatus 350 may be provided on the side of the interior member 16 or the side of the roof panel 13 in the functional sheet 30. For example, the electronic control unit 350A and the external communication antenna 350C may be provided on the side of the roof panel 13 in the functional sheet 30. The interior-side antenna 350B, the lamp 350D, the camera 350E, and the speaker 350F may be provided on the side of the interior member 16 in the functional sheet 30.

The first transmission member 340 passes through a route from the electronic control unit 350A in two separate directions on the right and left sides, and is connected to each apparatus 350. For example, focusing on the region closer to the left side in the functional sheet 30, some of the first transmission members 340 extend in the left direction from the electronic control unit 350A. Some of the first transmission members 340 are bended on a near side of a left edge of the functional sheet 30 and extend to the front side or the back side along the left edge, and are connected to each apparatus 350 provided on the left side of the functional sheet 30. For example, focusing on the region closer to the right side in the functional sheet 30, the other some of the first transmission members 340 extend in the right direction from the electronic control unit 350A. The other some of the first transmission members 340 are bended on a near side of a right edge of the functional sheet 30 and extend to the front side or the back side along the right edge, and are connected to each apparatus 350 provided on the right side of the functional sheet 30.

When the plurality of apparatuses 350 are collectively provided on the functional sheet 30, the first transmission member 340 may be provided on the functional sheet 30 along the same route, and divided in an area where the plurality of apparatuses 350 are concentrated to be connected to the plurality of apparatuses 350. For example, in the example illustrated in FIG. 13, located in a region closer to the right side in the middle portion in the front-back direction is a concentration area E where the interior-side antenna 350B, the camera 350E, the speaker 350F, and the lamp 350*db* thicken at narrow intervals compared with intervals around them. In this case, it is also applicable that the plurality of transmission members constituting the first transmission member 340 are directed from the electronic control unit 350A to the concentration area E described above along the right edge of the functional sheet 30, and branched into a plurality of members near the concentration area E, thereby being connected to the interior-side antenna 350B, the camera 350E, the speaker 350F, and the lamp 350*db*. In this case, the plurality of transmission members constituting the first transmission member 340 can be bundled or concentrated, thereby being routed in a parallel state. Thus, the plurality of transmission members constituting the first transmission member 340 can be compactly disposed on the functional sheet 30.

The apparatus 350 provided in the center of the functional sheet 30 in the width direction may be connected to any of the first transmission members 340 on the right and left sides. The first transmission member 340 may include a transmission member which is not located along the right and left edges of the functional sheet 30.

The second transmission member 360 extends from the electronic control unit 350A to the front side. Herein, the second transmission member 360 extending from the electronic control unit 350A is divided into the right and left sides, and extends to the front side along the right and left edges of the functional sheet 30. The second transmission member 360 is led to a vehicle body side along the A pillar, for example. The second transmission member 360 may be directly drawn from the electronic control unit 350A, or connected to the electronic control unit 350A via a connector. It is also applicable that the second transmission member 360 is not attached to the functional sheet 30, but is separated from the functional sheet 30 and led toward the A pillar, for example.

As described above, the first transmission member 340 itself may include a signal line and a power source line. When the first transmission member 340 and the apparatus 350 are located in different sides of the functional sheet 30, the second transmission member 360 may pass through the functional sheet 30, thereby being connected to the apparatus 350.

FIG. 14 is a cross-sectional view along an XIV-XIV line in FIG. 13. FIG. 14 illustrates a state where the interior-side antenna 350B is attached to the functional sheet 30. The interior-side antenna 350B has a configuration that an antenna element 350Ba made of metal is sandwiched between two insulating films 350Bb, for example. A wire-like conductor 350Bc connected to the antenna element 350Ba may also be sandwiched between the two insulating films 350Bb together with the antenna element 350Ba. The two insulating films 350Bb may be melted and welded to each other, or may also be bonded by an adhesive agent (including a gluing agent). Each of the antenna element 350Ba and the wire-like conductor 350Bc are sandwiched between the two insulating films 350Bb, thus protection performance and waterproof performance are improved. The interior-side antenna 350B is attached to the functional sheet 30 by a double-sided tape or an adhesive agent, for example.

Figure 15:
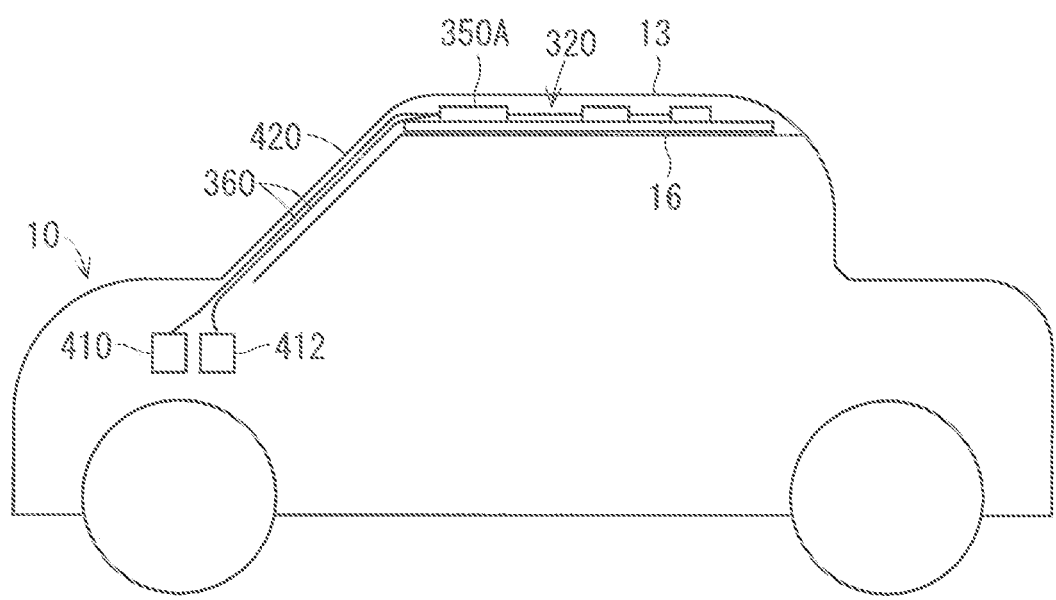
FIG. 15 is an explanation view illustrating a position of the wiring module in a vehicle.

FIG. 15 is an explanation diagram illustrating a position of the wiring module 320 in the vehicle 10. FIG. 15 illustrates a positional relationship in a plane vertical to a right-left direction. As illustrated in FIG. 15, the wiring module 320 is provided between the interior member 16 and the roof panel 13. Vehicle-side apparatuses 410 and 412 are provided on a vehicle body side. The vehicle-side apparatuses 410 and 412 are apparatuses provided on a lower side than the interior member 16 in the body 12, for example. As described above, each of the vehicle-side apparatuses 410 and 412 is a body ECU or a central ECU, or may also be a power source device. When the second transmission member 360 includes a signal line and a power source line, the vehicle-side apparatus 410 is an ECU and the vehicle-side apparatus 412 is a power source device. The second transmission member 360 drawn from the vehicle-side apparatuses 410 and 412 is drawn between the roof panel 13 and the interior member 16 through the A pillar 420, for example, and connected to the electronic control unit 350A. As described above, the second transmission member 360 may be directly introduced into the electronic control unit 350A, or connected to the electronic control unit 350A via a connector.

The wiring module 320 is assembled to the roof panel 13 as follows, for example. That is to say, an operator raises the wiring module 320 from a lower side of the roof panel 13 and attaches it to the roof panel 13, for example. This operation can be performed in a state where the operator looks up from the lower side.

Also according to the embodiment 2, the effect similar to that in the above embodiment 1 can be acquired.

Modification Example

In each embodiment described above, the wire-like transmission member may be connected to an apparatus which is not fixed to a functional sheet. For example, an antenna unit including an external communication antenna may be fixed to a roof panel. In this case, a connector connected to the antenna unit may be provided on a wire-like transmission member fixed to a functional sheet. A connector of the wire-like transmission member may be connected to the antenna unit when the wiring module is incorporated into the roof.

Each configuration described in the embodiments and modification examples thereof can be appropriately combined as long as they are not contradictory.

[Additional Statement]

The present specification also discloses the following contents.

A first aspect is a wiring module including a functional sheet, a wire-like transmission member fixed to the functional sheet, and an apparatus to which the wire-like transmission member is connected, wherein the apparatus is fixed to the functional sheet. Accordingly, the functional sheet, the wire-like transmission member, and the apparatus can be collectively incorporated into a vehicle easily.

A second aspect is the wiring module according to the first aspect, wherein the functional sheet is a sheet incorporated into a roof. Accordingly, the functional sheet, the wire-like transmission member, and the apparatus can be collectively incorporated into the roof, which extends relatively widely, easily.

A third aspect is the wiring module according to the first or second aspect, wherein the apparatus includes a direct fixation apparatus directly fixed to the functional sheet. Accordingly, the direct fixation apparatus can be fixed to the functional sheet without using the other member.

A fourth aspect is the wiring module according to any one of the first to third aspects, wherein an apparatus holder is fixed to the functional sheet, and the apparatus includes an indirect fixation apparatus fixed to the functional sheet via the apparatus holder. Accordingly, the indirect fixation apparatus can be fixed to the functional sheet via the apparatus holder.

A fifth aspect is the wiring module according to any one of the first to fourth aspects, wherein the apparatus includes an antenna. Accordingly, the antennas can be easily incorporated into the vehicle.

A sixth aspect is the wiring module according to the fifth aspect, wherein the antenna includes an external communication antenna disposed in a position corresponding to a hole formed in a body. Accordingly, the external communication antenna can be incorporated into the vehicle to be directed to an outer side of the body through the hole.

A seventh aspect is the wiring module according to the fifth or sixth aspect, wherein the functional sheet includes a radio wave shielding layer. Accordingly, the radio wave is shielded on an inner side and an outer side of the vehicle.

An eighth aspect is the wiring module according to the seventh aspect, wherein the antenna includes an interior-side antenna disposed on a vehicle interior side of the radio wave shielding layer. Accordingly, the radio wave from the interior-side antenna can be hardly leaked to the outer side of the vehicle.

A ninth aspect is the wiring module according to the seventh or eighth aspect, wherein the antenna includes an external communication antenna disposed on a vehicle exterior side of the radio wave shielding layer. Accordingly, the radio wave from the exterior communication antenna is not shielded by the radio wave shielding layer, but is radiated to the outer side of the vehicle.

A tenth aspect is the wiring module according to any one of the first to ninth aspects, wherein the functional sheet includes a heat insulating layer, and the apparatus includes a vehicle interior-side apparatus provided on a vehicle interior side of the heat insulting layer. The vehicle interior-side apparatus is located on the vehicle interior side of the heat insulating layer, thus increase in a temperature of the vehicle interior-side apparatus by sunlight from the outer side of the vehicle, for example, can be prevented.

An eleventh aspect is the wiring module according to any one of the first to tenth aspects, wherein the functional sheet includes at least one of a heat insulating layer, an acoustic insulation layer, and a radio wave shielding layer. The functional sheet can achieve at least one of a heat insulation function, an acoustic insulation function, and a radio wave shielding function.

EXPLANATION OF REFERENCE SIGNS 10 vehicle
12 body
13 roof panel
13a reinforcement bar
13h antenna hole
14 roof
16 interior member
16h hole
20, 20B, 320 wiring module
30 functional sheet
30b through hole
31h opening
32 heat insulating layer
34 acoustic insulation layer
36 radio wave shielding layer
36a base film
36b unit cell
37 additional function layer
39 base material
40, 40B wire-like transmission member
40E wiring
40a core wire
40b covering
48 connector
49 external communication antenna unit
50, 210, 350 apparatus
50A, 350A electronic control unit
50B, 350B interior-side antenna
50C external communication antenna unit
51 fixing piece
52 base member
53a external communication antenna
53b external communication antenna
54 cover
60 apparatus holder
62 holder body part
62a convex part
63 locking piece
64 fixing piece
66 holder-side connector
90 sun
110 communication apparatus
120 interior apparatus
150 fixation apparatus
250 indirect fixation apparatus
251 concave part
252 apparatus-side connector
340 first transmission member
350Ba antenna element
350Bb insulating film
350Bc wire-like conductor
350Bc insulating film
350C external communication antenna
350D, 350db lamp
350Da map lamp
350E camera
350F speaker
360 second transmission member
410, 412 vehicle-side apparatus
420 A pillar
E concentration area

The invention claimed is:

1. A wiring module, comprising:
a functional sheet disposed between a roof panel forming a roof part of a vehicle and an interior member forming a ceiling shape of a vehicle interior to planarly extend over the roof panel and the interior member; and
a transmission member provided on an external portion of the functional sheet, wherein
the functional sheet includes a plurality of layers, in which at least one of the plurality of layers has a radio wave shielding function, at least one of the plurality of layers has a heat insulation function, and at least one of the plurality of layers has an acoustic insulation function,
the transmission member is electrically connected to a vehicle-side apparatus mounted to a side of the vehicle,
the transmission member is formed to extend to a position where the transmission member can perform a power supply to or communication with a roof-side apparatus mounted to the roof part in the functional sheet,
the transmission member includes a first transmission member formed to extend from a position in the functional sheet where an electronic control unit controlling the roof-side apparatus is mounted to a position where the transmission member can perform a power supply to or communication with the roof-side apparatus,
the electronic control unit is provided on the functional sheet, and
the transmission member is provided on the external portion of the functional sheet opposite of the radio wave shielding layer having the radio wave shielding function.

2. The wiring module according to claim 1, further comprising
a second transmission member extending from a position in the functional sheet where the electronic control unit is mounted to an outward direction of the functional sheet and electrically connected to the vehicle-side apparatus.

3. The wiring module according to claim 1, wherein
a holder holding and electrically connecting at least one of the electronic control unit and the roof-side apparatus to the transmission member is provided on the functional sheet.

4. The wiring module according to claim 1, wherein
the roof-side apparatus includes an interior-side antenna performing wireless communication with an apparatus in the vehicle interior, and
the interior-side antenna is provided closer to a side of the vehicle interior in relation to the radio wave shielding layer having the radio wave shielding function on the functional sheet including the radio wave shielding layer.

5. The wiring module according to claim 1, wherein
the roof-side apparatus includes an external communication antenna performing communication with an apparatus located on an outer side of the vehicle, and
the external communication antenna is provided closer to the outer side of the vehicle in relation to the radio wave shielding layer having the radio wave shielding function on the functional sheet including the radio wave shielding layer.

6. The wiring module according to claim 1, wherein
the roof-side apparatus includes an external communication antenna provided on the roof panel to communicate with an apparatus located on the outer side of the vehicle, and
the external communication antenna is electrically connected to the transmission member via a connector disposed in a position in the functional sheet where the external communication antenna is provided.

7. The wiring module according to claim 1, wherein
the functional sheet includes a hole provided in a central portion, and
the roof-side apparatus is provided through the hole such that the roof-side apparatus is provided on a side of the functional sheet opposite to a side in which the first transmission member is provided.

\* \* \* \* \*